(12) United States Patent
Mauseth et al.

(10) Patent No.: US 8,725,597 B2
(45) Date of Patent: May 13, 2014

(54) MERCHANT SCORING SYSTEM AND TRANSACTIONAL DATABASE

(75) Inventors: Michael Jon Mauseth, Denver, CO (US); Woodrow Arnold Jones, Jr., Haymarket, VA (US); Rajeev Kumar Malik, Washington, DC (US); Joel Richard Springer, Englewood, CO (US)

(73) Assignee: Google Inc., Mountain View, CA (US)

( * ) Notice: Subject to any disclaimer, the term of this patent is extended or adjusted under 35 U.S.C. 154(b) by 868 days.

(21) Appl. No.: 12/109,772

(22) Filed: Apr. 25, 2008

(65) Prior Publication Data

US 2008/0270209 A1    Oct. 30, 2008

Related U.S. Application Data

(60) Provisional application No. 60/914,000, filed on Apr. 25, 2007.

(51) Int. Cl.
*G06Q 10/00* (2012.01)
*G06Q 30/00* (2012.01)
*G06Q 40/00* (2012.01)

(52) U.S. Cl.
USPC .............................................. 705/28; 705/29

(58) Field of Classification Search
USPC .......................................................... 705/10
See application file for complete search history.

(56) References Cited

U.S. PATENT DOCUMENTS 5,734,890 A    3/1998    Case et al.
(Continued)

FOREIGN PATENT DOCUMENTS

KR    10-2006-0020874 A    6/2006
(Continued)

OTHER PUBLICATIONS

Science, Collaborative reputation mechanisms for electronic marketplaces, Zacharia, Moukas and Maes, Published in Decision Support Systems, vol. 29, Issue 4, Dec. 2000, pp. 371-388, downloaded from http://www.sciencedirect.com/science/article/pii/S0167923600000841 on Jul. 19, 2013.*

(Continued)

*Primary Examiner* — Paul Danneman
(74) *Attorney, Agent, or Firm* — Johnson, Marcou & Issacs, LLC

(57) ABSTRACT

A merchant scoring system predicts and reports the likelihood that a merchant is reliable (e.g., trustworthy, honest, and reputable), which is expected to translate into a positive consumer experience. The system collects data from a variety of data sources, including combinations of the merchant, third-parties, and/or customers who have transacted with the merchant. A scoring model is executed on this collected data to determine an independent and objective merchant reliability metric that predicts the expected reliability of a merchant within a range. The system may also track transactions of individual merchants, populating a transaction history database with information about each merchant for use in this collection and scoring process. The transaction history data and other data may also be accessible to a prospective customer to build his or her confidence in and understanding of the merchant reliability metric and his or her trust of the merchant.

18 Claims, 15 Drawing Sheets

(56) References Cited

U.S. PATENT DOCUMENTS

| | | | |
|---|---|---|---|
| 6,141,653 | A | 10/2000 | Conklin et al. |
| 6,199,102 | B1 | 3/2001 | Cobb |
| 6,260,024 | B1 | 7/2001 | Shkedy |
| 6,263,317 | B1 | 7/2001 | Sharp et al. |
| 6,546,416 | B1 | 4/2003 | Kirsch |
| 6,658,394 | B1 * | 12/2003 | Khaishgi et al. ............... 705/58 |
| 6,662,192 | B1 | 12/2003 | Rebane |
| 6,754,636 | B1 | 6/2004 | Walker et al. |
| 7,143,089 | B2 | 11/2006 | Petras et al. |
| 7,181,761 | B2 | 2/2007 | Davis et al. |
| 7,249,175 | B1 | 7/2007 | Donaldson |
| 7,272,853 | B2 | 9/2007 | Goodman et al. |
| 7,295,053 | B2 | 11/2007 | Abdulhayolu |
| 7,389,913 | B2 | 6/2008 | Starrs |
| 7,403,922 | B1 | 7/2008 | Lewis et al. |
| 7,409,258 | B2 | 8/2008 | Huang et al. |
| 7,464,264 | B2 | 12/2008 | Goodman et al. |
| 7,552,186 | B2 | 6/2009 | Werner et al. |
| 7,665,131 | B2 | 2/2010 | Goodman et al. |
| 7,668,769 | B2 | 2/2010 | Baker et al. |
| 7,742,947 | B2 | 6/2010 | Fu et al. |
| 7,778,864 | B2 | 8/2010 | Conrad et al. |
| 7,778,878 | B2 | 8/2010 | Harding et al. |
| 7,778,884 | B2 | 8/2010 | Bamborough et al. |
| 7,792,704 | B2 | 9/2010 | Harding et al. |
| 7,853,480 | B2 | 12/2010 | Taylor et al. |
| 7,899,701 | B1 | 3/2011 | Odom |
| 7,959,074 | B1 | 6/2011 | Chopra et al. |
| 8,001,058 | B1 | 8/2011 | Harding et al. |
| 8,046,832 | B2 | 10/2011 | Goodman et al. |
| 8,065,370 | B2 | 11/2011 | Hulten et al. |
| 8,204,799 | B1 | 6/2012 | Murray et al. |
| 8,396,935 | B1 | 3/2013 | Ciurumelea et al. |
| 8,407,110 | B1 | 3/2013 | Joseph et al. |
| 2001/0054008 | A1 | 12/2001 | Miller et al. |
| 2002/0083020 | A1 | 6/2002 | Leon |
| 2002/0120559 | A1 * | 8/2002 | O'Mara et al. ............... 705/38 |
| 2002/0147622 | A1 | 10/2002 | Drolet et al. |
| 2002/0178074 | A1 | 11/2002 | Bloom |
| 2002/0194119 | A1 | 12/2002 | Wright et al. |
| 2003/0009698 | A1 | 1/2003 | Lindeman et al. |
| 2003/0023499 | A1 | 1/2003 | Das et al. |
| 2003/0135432 | A1 | 7/2003 | McIntyre et al. |
| 2003/0187759 | A1 | 10/2003 | Arthus et al. |
| 2004/0044563 | A1 | 3/2004 | Stein |
| 2004/0044624 | A1 | 3/2004 | Katou et al. |
| 2005/0015455 | A1 | 1/2005 | Liu |
| 2005/0033668 | A1 | 2/2005 | Garcia et al. |
| 2005/0144052 | A1 | 6/2005 | Harding et al. |
| 2005/0149455 | A1 | 7/2005 | Bruesewitz et al. |
| 2005/0197892 | A1 | 9/2005 | Bilibin et al. |
| 2006/0047598 | A1 | 3/2006 | Hansen |
| 2006/0253458 | A1 * | 11/2006 | Dixon et al. ............... 707/10 |
| 2007/0083523 | A1 | 4/2007 | Gerard et al. |
| 2007/0106582 | A1 | 5/2007 | Baker et al. |
| 2007/0129999 | A1 | 6/2007 | Zhou et al. |
| 2007/0130109 | A1 | 6/2007 | King et al. |
| 2007/0168331 | A1 * | 7/2007 | Reddy et al. ............... 707/3 |
| 2007/0174144 | A1 | 7/2007 | Borders et al. |
| 2007/0185779 | A1 | 8/2007 | O'Kelley |
| 2007/0192215 | A1 | 8/2007 | Taylor et al. |
| 2007/0214066 | A1 | 9/2007 | Harding et al. |
| 2007/0255606 | A1 | 11/2007 | Huang et al. |
| 2008/0027737 | A1 | 1/2008 | Watkins |
| 2008/0071638 | A1 | 3/2008 | Wanker |
| 2008/0270209 | A1 | 10/2008 | Mauseth et al. |
| 2008/0301009 | A1 | 12/2008 | Plaster et al. |
| 2009/0037412 | A1 | 2/2009 | Bard et al. |
| 2009/0106397 | A1 | 4/2009 | O'Keefe |
| 2009/0119161 | A1 | 5/2009 | Woda et al. |
| 2009/0138441 | A1 | 5/2009 | Valentine et al. |
| 2009/0144070 | A1 | 6/2009 | Psota et al. |
| 2009/0164338 | A1 | 6/2009 | Rothman |
| 2009/0187575 | A1 | 7/2009 | DaCosta |
| 2010/0114776 | A1 | 5/2010 | Weller et al. |
| 2010/0161734 | A1 | 6/2010 | Wang |
| 2010/0274609 | A1 | 10/2010 | Shoemaker et al. |
| 2010/0274791 | A1 | 10/2010 | Chow et al. |
| 2011/0087613 | A1 | 4/2011 | LaPasta et al. |
| 2011/0137747 | A1 | 6/2011 | Bodeman et al. |
| 2011/0225076 | A1 | 9/2011 | Wang et al. |
| 2011/0238575 | A1 | 9/2011 | Nightengale et al. |
| 2012/0130917 | A1 | 5/2012 | Forsblom |
| 2012/0185404 | A1 | 7/2012 | Koh |
| 2012/0209771 | A1 | 8/2012 | Winner et al. |
| 2012/0310786 | A1 | 12/2012 | Suzuki |

FOREIGN PATENT DOCUMENTS

| | | |
|---|---|---|
| KR | 2007-0091527 A | 9/2007 |
| KR | 10-2002-0021956 A | 2/2008 |
| KR | 10-2009-0000700 A | 1/2009 |
| KR | 2010-0011393 A | 2/2010 |
| WO | WO 2012/170733 A1 | 12/2012 |

OTHER PUBLICATIONS

U.S. Appl. No. 13/692,959 to Jackson et al. filed Dec. 3, 2012.
U.S. Appl. No. 13/157,269 to Fallows filed Jun. 9, 2011.
U.S. Appl. No. 13/935,400 to Cowan filed Jul. 3, 2013.
Letter from Ed Stevens of Firepoppy to Jim Hudson of Shopatron pp. 1-5 Date: Sep. 12, 2000.
"XML Connects to Almost Anything" *Firepoppy.Broker.Pro*—http://replay.web.archive.org/2003/0822021619/http://www. pp. 1 Date: Aug. 22, 2003.
eBay Buyer Protection http://web.archive.org/web/20110527130621/http://pages.ebay. pp. 1 Date: May 27, 2011.
eBay Buyer Protection—eBay, Inc. http://web.archive.org/web/20110501062428/http://pages.ebay. pp. 1-7 Date: May 1, 2011.
"Shopatron—FAQ" http://replay.web.archive.org/20040117021450/http://www.firepoppy. pp. 1-3 Date: Jan. 17, 2004.
Shopatron Screenshots (7 pages) *Internet websearch "Shopatron"* pp. 1-7 Date: Jan. 1, 2000.
Feeney, B. A. Office Action issued in copening U.S. Appl. No. 13/157,269, filed Jun. 9, 2011 pp. 1-26 Date: Aug. 1, 2013.
Gie, O. E. International Search Report and Written Opinion for International Application No. PCT/US2013/035688 pp. 1-10 Date: Jul. 12, 2013.
Hong, K. H. International Search Report and Written Opinion for International Patent Application No. PCT/US2012/041419 pp. 1-3 Date: Sep. 24, 2012.
Mesiaszek, M. Office Action issued in copending U.S. Appl. No. 13/247,966, filed Sep. 28, 2011 pp. 1-13 Date: Sep. 14, 2012.
Steinhauer, A. Yahoo Boss Finds Profit in Searches; First-Quarter Revenue Jumps 47 per cent Chief's Sponsored Searches' Strategy Generates Earnings *Toronto Star*, Toronto (retrieved from ProQuest) pp. C. 04 Date: Apr. 10, 2003.
Chumpitaz, B., Office Action issued in copending U.S. Appl. No. 13/692,959, filed Dec. 3, 2012, pp. 1-16, Oct. 8, 2013.
Misiazszek, M., Office Action issued in copending U.S. Appl. No. 13/247,966, filed Sep. 28, 2011, pp. 1-12, Oct. 3, 2013.
U.S. Appl. No. 12/720,082 to Wang et al. filed Mar. 9, 2010.
U.S. Appl. No. 13/443,675 to Ciurumela filed Apr. 10, 2012.

* cited by examiner

FIG. 10

MERCHANT SCORING SYSTEM AND TRANSACTIONAL DATABASE

CROSS-REFERENCE TO RELATED APPLICATIONS

The present application claims benefit of U.S. Provisional Patent Application No. 60/914,000, filed Apr. 25, 2007 and entitled "Merchant Scoring and Transactional Database", which is specifically incorporated by reference for all that it discloses and teaches.

BACKGROUND

Advances in online commerce technology have permitted merchants to launch online businesses relatively quickly and without a substantial investment. However, when a business is built in a market so rapidly, the merchant often does not have the opportunity to build a significant amount of brand recognition and trust with its customers. As such, consumers are wary of spending their dollars and entrusting their credit card information with merchants they do not know well.

There currently exist limited services to address certain aspects relating to secure transmission of data in merchant transactions. These services may involve site advisors, hacker testing, and secure sockets layer certificates ("SSL Certificates"), etc. Site advisors and hacker testing services audit websites for malicious code or the susceptibility for unauthorized access to the site (and customer data). SSL Certificates, one of the most commonly used services/products that has been designed to elicit trust from consumers, provide two methods for addressing consumers' confidence: (i) they enable encrypted communications with a website; and (ii) for Extended Validation ("EV") and Operational Validation ("OV") SSL Certificates, they identify the legal entity that controls a website (e.g., reducing the chance that a consumer establishes an encrypted connection with an unauthorized party).

Services involving site advisors, hacker testing, and SSL Certificates only help address data security, which is a small contribution to the consumers' lack of confidence in unknown e-commerce sites. For example, EV SSL Certificates-which is considered the highest and most secure form of SSL Certificates—expressly exclude assurances, representations or warranties about the behavior of the merchant and/or the quality of a consumer's experience with the merchant. In addition, an SSL Certificate does not provide any indications or assessments about what happens to a consumer's personal and/or financial information once the data is passed to the merchant's website.

In fact, a group of leading SSL Certificate issuers and providers of Internet browsers recently established the Certification Authority/Browser (CA/Browser) Forum, to develop standards and guidelines for EV SSL Certificates in order to improve the security of online transactions. The CA/Browser Forum, which is comprised of companies such as Microsoft Corporation and VeriSign, Inc., acknowledges the incomplete nature of these services in addressing a consumer's lack of confidence in e-commerce sites. The CA/Browser Forum Guidelines, promulgated by a number of leading issuers of EV SSL Certificates, states that:

EV Certificates focus only on the identity of the Subject named in the Certificate, and not on the behavior of the Subject. As such, an EV Certificate is not intended to provide any assurances, or otherwise represent or warrant:

(1) That the Subject named in the EV Certificate is actively engaged in doing business;
(2) That the Subject named in the EV Certificate complies with applicable laws;
(3) That the Subject named in the EV Certificate is trustworthy, honest, or reputable in its business dealings; or
(4) That it is "safe" to do business with the Subject named in the EV Certificate.
[See Section B(2)(c) (Excluded Purposes) of the CA/Browser Forum Guidelines for Extended Validation Certificates (Dated Oct. 20, 2006 as Version 1.0—Draft 11) (Emphasis added).]

SUMMARY

Implementations described and claimed herein address the foregoing problems by providing a system for predicting and reporting the likelihood that a merchant is reliable (e.g., trustworthy, honest, and reputable) in its business dealings. A merchant reliability metric in this technology is expected to translate into a positive or good consumer experience in most circumstances. In one implementation, the described technology collects data from a variety of data sources, including combinations of the merchant, third-parties, and/or customers who have transacted with the merchant. A scoring model is executed on this collected data to determine an independent and objective merchant reliability metric (e.g., a "web score" or "W Score") that predicts the expected reliability of an online merchant within a range. The described technology may also track transactions of individual merchants, populating a transaction history database with information about each merchant for use in this collection and scoring process. The transaction history data and other data may be used not only to supplement the merchant reliability metric but may also be accessible to a prospective customer to build his or her confidence in and understanding of the merchant reliability metric and his or her trust of the merchant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 10 illustrates an example web page reporting a merchant's management information.

DETAILED DESCRIPTION

The described technology addresses, among other things, a consumer's lack of trust or understanding of reliability in unknown or unfamiliar e-commerce sites that has thus far not been addressed by existing services. A merchant reliability metric is generated to predict the likelihood that a Web merchant is reliable (e.g., trustworthy, honest, and reputable) in its business dealings. These characteristics are expected to translate into a positive or good consumer experience in most circumstances. Data informing the merchant reliability metric is collected from a variety of sources, including without limitation a combination of one or more of (a) the merchant itself, (b) third-party data sources, and (c) customers who have transacted with the merchant. Such data is collected into a datastore that is accessible by a scoring model, which computes the merchant reliability metric. The described technology may also be applied to offline merchants if the appropriate data can be collected and the merchant reliability metric can be reported in a manner that is conspicuous to consumers of these offline merchants.

Figure 1:
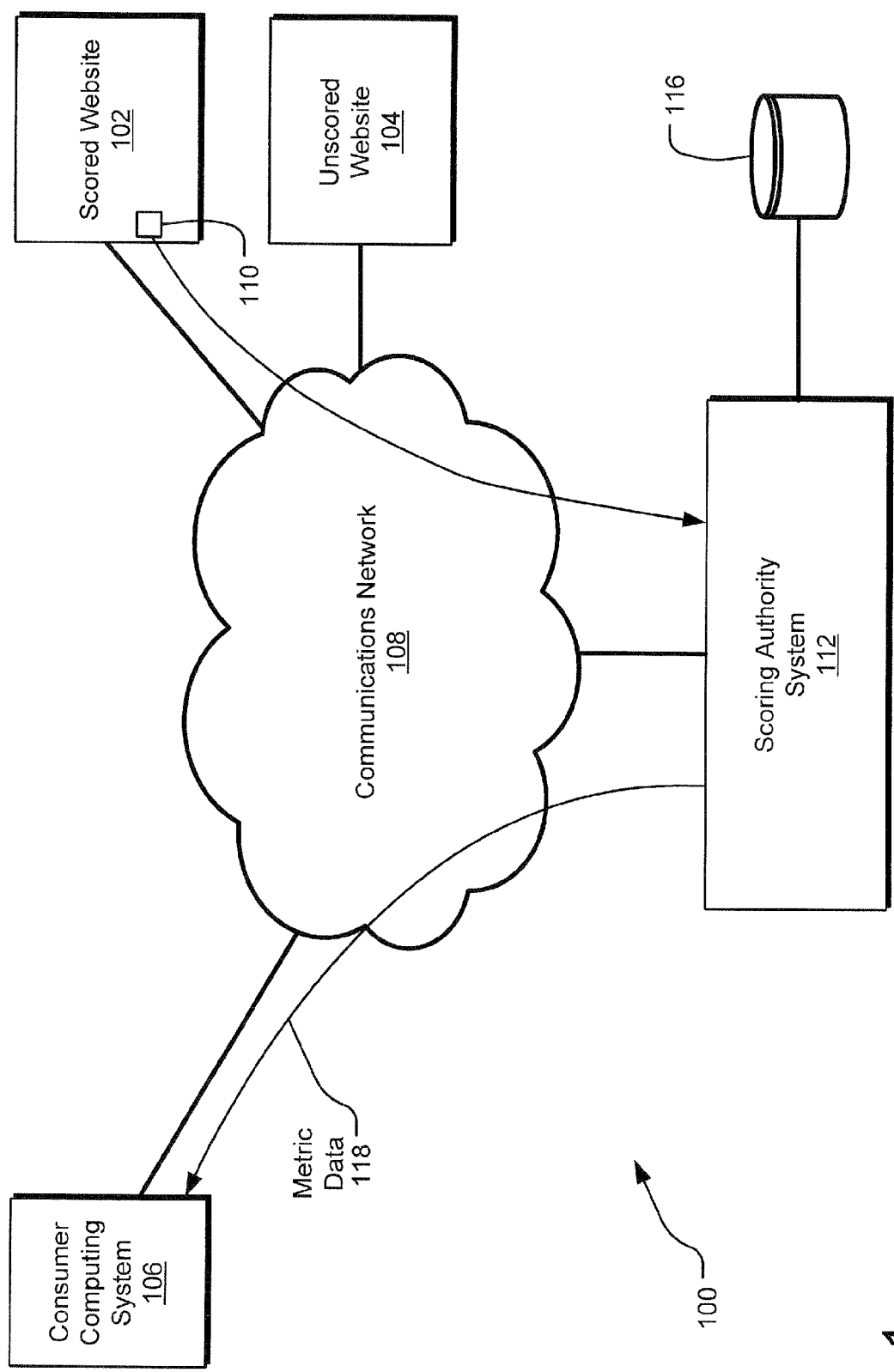
FIG. 1 illustrates an example system providing a merchant reliability metric of a merchant running a scored website to a consumer.

FIG. 1 illustrates an example system 100 providing a merchant reliability metric of a merchant running a scored website 102 to a consumer. In a typical scenario, a consumer may access one or more websites, including the scored website 102 and an unscored website 104, via a communications network 108, such as the Internet. The consumer may use a consumer computing system 106, such as a desktop computer, a laptop computer, a mobile computing/telephony device or media player, etc., to access the websites 102 or 104. Either website 102 or 104 may exhibit a variety of trust-related representations, including SSL certification badges, hacker safety badges, affiliation with a trusted retailer (e.g., www.bestbuy.com), etc. However, individually, such characteristics only provide limited identification of specific types of trust-related representations on a YES/NO basis, and none of them articulate a merchant reliability metric (e.g., a web score) predicting the expected reliability of an online merchant within a range of reliability. Furthermore, such characteristics are not personalized to the individual risk tolerance of a consumer, making it more difficult for the consumer to understand relative to his or her own expectations.

The presence of a merchant reliability metric for the merchant running the scored website 102 is indicated by a merchant reliability metric badge 110 displayed or being otherwise accessible via the scored website 102. The merchant reliability metric badge 110 in the illustrated implementation represents a hyperlink and/or a control that provides access to a summary display of the merchant reliability metric and/or information collected to compute or otherwise support the merchant reliability metric. For example, in one implementation, a user may hover the mouse pointer over the merchant reliability metric badge and a summary of the merchant reliability metric is displayed (e.g., the name of the merchant, its merchant reliability metric, its merchant identifier, etc.). In another implementation, a user may select the merchant reliability metric badge to navigate to a web page that provides a summary of the merchant reliability metric as well as access to more specific supporting information (see e.g., the web page 202 of FIG. 2). Other implementations are contemplated, including a control that generates a merchant reliability metric report with the computed merchant reliability metric and supporting information compiled therein.

To compute the merchant reliability metric, a scoring authority system 112 collects information from a variety of data sources, including without limitation a combination of one or more of (a) the merchant itself, (b) third-party data sources (e.g., website traffic statistics sources, public records sources, commercial reporting bureaus, etc.), and (c) customers who have transacted with the merchant. The collected information is stored in a data storage system 116 that is accessible by the scoring authority system 112. The scoring authority system 112 executes a scoring model (not shown) on this information to generate the merchant reliability metric within a range of trust. For example, on a scale of 0-100, the merchant reliability metric in FIG. 2 indicates a merchant reliability metric of 48.

Depending on the level of risk tolerance or aversion a consumer may have, the consumer may consider this merchant reliability metric relative to a higher reliability metric of another merchant in their shopping decision. In one implementation, a merchant reliability metric of 48 may indicate that the merchant is predicted to be less reliable than over 50% of the scored merchants, although other meanings of a merchant reliability metric may be employed.

In one implementation, the merchant reliability metric indicates that the merchant is predicted to be more or less reliable than other scored merchants, reliable in the sense that the merchant is expected to (i) deliver the product (ii) in either good or excellent condition (iii) in a timely manner while (iv) keeping its customers' personal and financial information secure; the merchant (v) is more likely to honor obligations for customer service and support (e.g., return policies, refunds, etc.); etc. In various implementations, reliability is a likelihood that one or more of these results will occur with the merchant, based on a scoring of certain defined merchant reliability characteristics.

In addition to providing a merchant's reliability metric, the system also provides access to the background information used to generate the merchant's reliability metric. As such, if the consumer wishes to understand why a merchant's reliability metric is so low, the consumer can view a merchant reliability metric report or navigate into the various tabs available on a merchant reliability metric webpage. For example, the merchant reliability metric may be lower because of a high order return rate on specific sold products through the merchant's website. The more detailed supporting information can identify trends that the high return rate was limited to a specific product that the consumer is not interested in or that the return rate has decreased in recent months and the merchant reliability metric has therefore been improving. Importantly, the unscored website 104 does not indicate any predicted level of reliability for the associated merchant, so the consumer does not have the same opportunity to evaluate and/or investigate the likely reliability of the merchant.

An output of the system 100 is a merchant reliability metric and supporting information (both included in metric data 118) that a consumer can consider to determine whether to transact business with the associated merchant through the scored website 102. As described later, the merchant reliability metric can also be personalized for individual consumers, based on information provided by each consumer and/or upon other information available about each consumer. For example, a consumer who frequently returns merchandise from e-commerce orders may be less tolerant of a strict and limited return policy than another consumer. Therefore, such a consumer may weigh the return policy component of the merchant reliability metric more heavily than another consumer.

Figure 2:
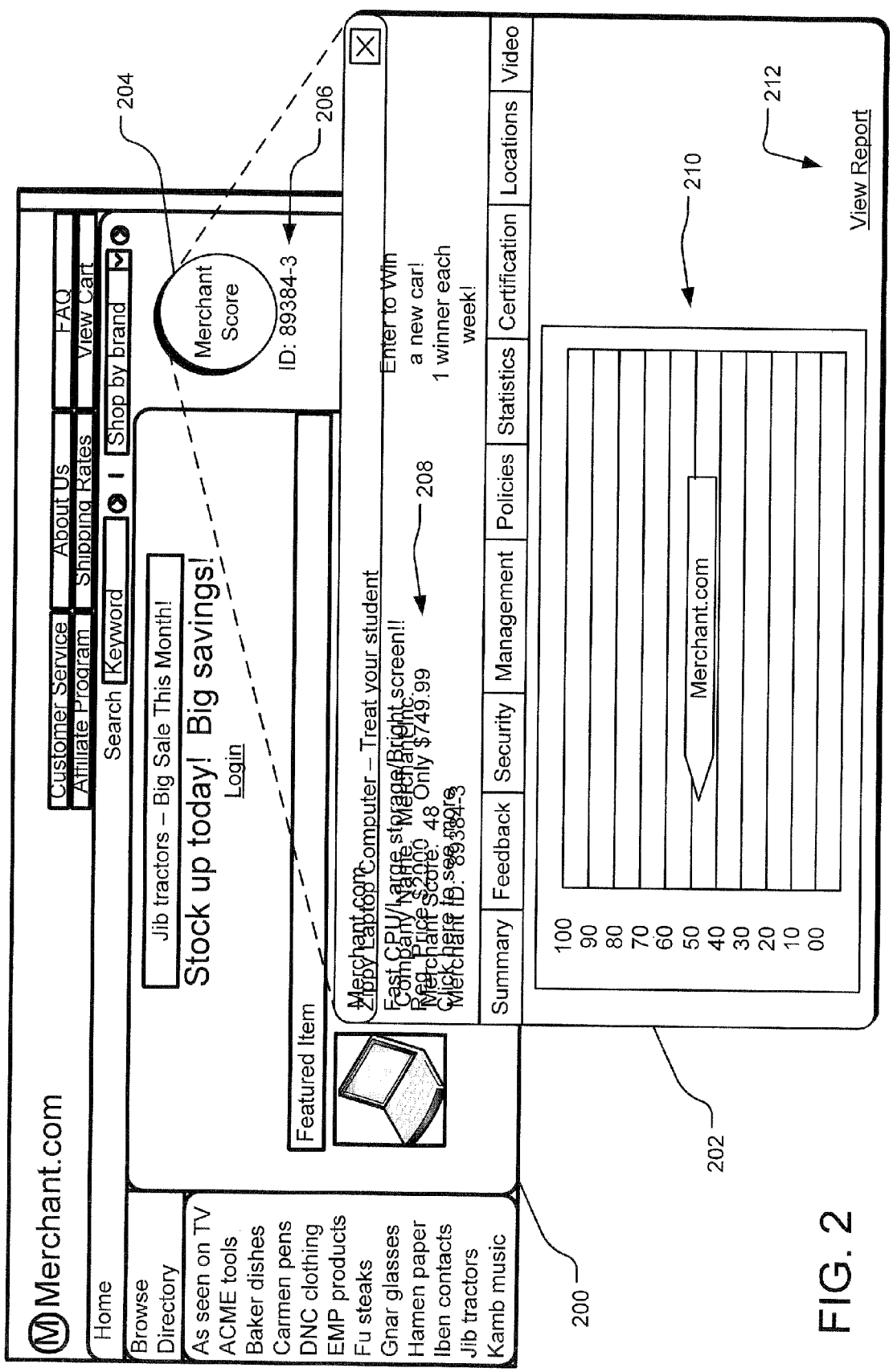
FIG. 2 illustrates an example web page from a scored website and an associated merchant reliability metric display.

FIG. 2 illustrates an example web page 200 from a scored website and an associated merchant reliability metric display 202. The web page 200 is retrieved from the merchant's website and displayed to the consumer on the consumer's computing system. The web page 200 represents a web page from a typical e-commerce website that has been scored using a merchant reliability metric, as represented by the Merchant Score badge 204 displayed on the web page 200. In the illustrated example, a merchant identifier ("ID") 206 is displayed just below the Merchant Score Badge 204.

In one implementation, by hovering or otherwise selecting the pointer (e.g., a mouse pointer) over the Merchant Score badge 204, a consumer may invoke the display of a merchant reliability metric summary (not shown), which may be displayed as an overlay on the web page 200. The merchant reliability metric summary indicates the computed merchant reliability metric (e.g., web score) to the user is associated with the displayed web page 200. Other information may also be indicated by the web page 200, including the name of the merchant and the merchant ID.

In another implementation, the Merchant Score badge 204 may be selected by the consumer to display the merchant reliability metric display 202. In the illustrated example, the merchant reliability metric display 202 is represented in a web page rendered in a window on the consumer computing system in which the merchant reliability metric (e.g., the web score) is displayed, along with the company name and merchant ID, in region 208. The web page also provides a graphical representation 210 of the merchant reliability metric.

Example tabs for accessing additional information relating to the merchant reliability metric are displayed above the graphical representation 210. Examples of the displays of the various categories associated with the tabs are provided later in this document. Generally, the information relating to and supporting the merchant reliability metric is accessible by the consumer via the tabs in the web page. For example, if the consumer found the merchant reliability metric to be lower than he or she wanted, the consumer could examine the information supporting the merchant reliability metric to gain an understanding of what kind of information reduced the merchant reliability metric for this merchant (e.g., no SSL certificate). If the consumer intended to order the product via telephone after shopping online, the lack of an SSL certificate may not be a concern. Another example control 212 represents a hyperlink to a report displaying some or all of the information relating to the merchant reliability metric.

Figure 3:
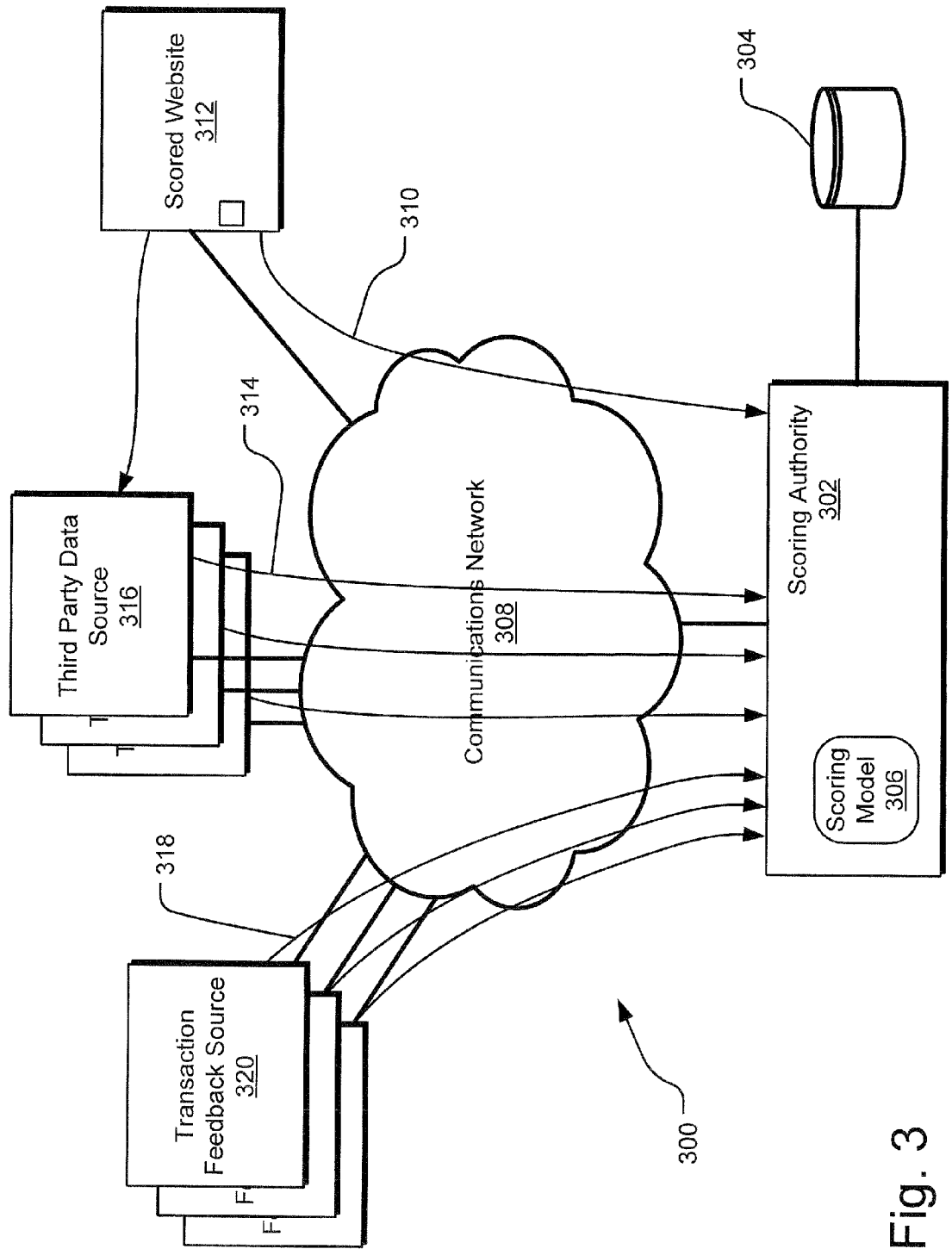
FIG. 3 illustrates an example system collecting source data upon which a merchant reliability metric may be based.

FIG. 3 illustrates an example system 300 collecting source data upon which a merchant reliability metric may be based. A scoring authority 302 collects information from a variety of sources, including without limitation a combination of one or more of (a) the merchant itself, (b) third-party data sources 316, and (c) customers who have transacted with the merchant. Collectively, the third-party data sources 316 and the customers are considered non-merchant data sources. The information collected by the scoring authority 302 is specified in an inspection template that defines the reliability characteristics to be collected from each type of data source. Such data is collected into a merchant reliability datastore 304 that is accessible to a scoring model 306, which computes the merchant reliability metric (e.g., a web score). Such information may be collected via a communications network 308 or through other means (e.g., hard copying reports, phone calls, etc.).

In one implementation, the inspection template may also contain the point values associated with individual reliability characteristics, such that the inspection template both defines what data is collected from the merchant reliability datastore 304 and maps the data to point values. In another implementation, the inspection template merely identifies the data to be collected for individual reliability characteristics, and the scoring model does the mapping of characteristic data to point values.

In one implementation, the merchant provides information (e.g., merchant-provided information) used to compute the merchant reliability metric. See the communications 310, for example, flowing from the scored website 312 through the communications network 308 to the scoring authority 302. It should be understood, however, that the communication of merchant-provided information may flow via alternative paths, such as alternative electronic communication channels, telephone, mail or courier for entry into the scoring authority 302.

For example, when signing up with a scoring service to obtain a merchant reliability metric and a merchant reliability metric badge, the merchant may be asked to provide certain information in an online form. In addition, the merchant may be asked to submit signed and/or notarized affidavits relating to its policies, etc. (e.g., representing adherence to a written return policy). A merchant may also provide or demonstrate certain characteristics to an investigator sent by a scoring service or other entity to collect information used in computation of the merchant reliability metric. A binary parameter value may be assigned to the presence of certain merchant characteristics or the lack thereof, based on representations made by the merchant itself. In some cases, the binary parameter value may indicate that the merchant merely provided information pertaining to a specific reliability characteristic. In other cases, the binary parameter value may indicate that the provided information was independently verified. For example, investigators may evaluate the data against data obtained through other means, including on-site visits and cross-referencing with other reliability data. In yet other cases, the binary parameter value may indicate that the provided information meets certain requirements (e.g., a written return policy allows at least a specified number of days for a customer to request a return). A variable parameter value may be assigned to the value of other merchant characteristics, such as a parameter value that represents a point within a value range or a certain level within a range of discrete levels.

Example reliability characteristics obtained from merchant-provided information are listed below, although it should be understood that other characteristics may also contribute to the merchant reliability metric. Some of these characteristics may be parameterized as a binary parameter value (e.g., does the merchant provide a URL to a written privacy policy and was a written privacy policy verified at the provided URL) and others may be parameterized by a variable parameter value (e.g., how long has the merchant been in business and how many contact points does a merchant provide for order assistance/technical assistance?). Also, the merchant-provided information may be compared against any corresponding third-party or transactional information, such that a match provides a positive contribution to the merchant reliability metric and a mismatch provides a negative contribution to the merchant reliability metric. Various combinations of these characteristics and others are contemplated.

- Does the merchant provide relevant business information, including business name, personal contact name, address, phone number, home page URL, subsidiary/affiliate/parent information, etc.?
- Does the merchant provide URLs for encrypted communications?
- How long has the merchant been in business?
- Does the merchant provide information identifying merchant's customer service personnel and contact information?
- Does the merchant provide URL to information about merchant's customer service offerings?
- Does the merchant state that it adheres to a written privacy policy and provide a URL to same?
- Does the merchant state that it adheres to a written return policy and provide a URL to same?
- Does the merchant state that it adheres to an anti-spam policy and provide a URL to same?
- Does the merchant state that it adheres to written acceptable usage policy and provide a URL to same?
- Does the merchant state that it adheres to written guarantee policy for goods and/or services and provide a URL to same?
- Does the merchant provide a URL to information about guarantees, including limits on the guarantee?
- Does the merchant provide a URL to written site terms and conditions of the merchant's website
- Does the merchant provide evidence of compliance with relevant laws, regulation and industry standards?
- Does the merchant provide evidence of seal/sponsor URLs associated with the merchant?
- Does the merchant provide a Frequently Asked Question (FAQ) or help document and a URL to same?
- Does the merchant provide contact information for order assistance and/or technical assistance?
- How many contact points does the merchant provide for order assistance and/or technical assistance?
- What types of contact points does a merchant provide (e.g., 1-800 number, instant messenger, email, physical address, toll phone number, etc.)? Note: These types may be individually weighted to provide a contact point score that contributes to the overall merchant reliability metric.
- Does the merchant provide biographies of the merchant's management team members?
- What type of coding is used for the website (e.g., HTML, Flash, etc.)?
- What type of technology/hardware is used for the website?
- What type of encryption is used by the website?
- Is the merchant an authorized reseller/dealer and for how many/which vendors?
- What is the performance of the site (e.g., how many transactions or customers the site has had)?
- Does the website check for malware/spyware?
- How many physical facility locations does the merchant identify?
- In which geographical locations does the merchant have physical facilities?
- How many employees does the merchant indicate?
- What is the status of the merchant's incorporation or business registration?
- In what state is the merchant incorporated?
- How is the business organized (e.g., sole proprietorship, LLC, corporation)?
- What is the gross sales volume for the merchant?
- Does the merchant identify a registered agent and who is the registered agent?
- Does the merchant provide banking information, account transaction histories, and balances?
- Does the merchant own property or is the merchant subject to a lease under the company name?
- Does the merchant provide evidence of a business owner's insurance policy or a commercial and general liability insurance policy?
- What are the limits of the merchant's insurance policies?
- Does the merchant identify and provide contact information for its board of directors?
- What are the genders of the members of the merchant's ownership team? Note: Fraud research indicates that males are far more likely to commit fraud than females.
- What are the nationalities of the members of the merchant's ownership team?
- What are the ages of the members of the merchant's ownership team?
- Does the merchant possess a merchant account for accepting credit cards?
- How many credit cards does the merchant accept and which ones are accepted?
- How many payment processor relationships does the merchant identify and what are they?
- How many customers/purchases has the merchant had in a current period?
- How many customers/purchases did the merchant have in historical periods?
- How many complaints have been filed by customers against the merchant?
- Against which other merchants does the merchant like to be compared?
- What type of products/services does the merchant provide?
- What references does the merchant provide, including trade references, customer references, and bank references?
- What kind of financial information does the merchant provide?
  - Annual/monthly/daily revenues?
  - Annual/monthly/daily profit?
  - 30/60 day debt?
  - Total amount of debt?
  - Total amount of liens?
  - Financial statements (third party prepared vs. merchant-prepared)
  - Auditor statements?
  - Number, duration, and amounts of credit lines?
  - Outstanding lawsuits, criminal investigations, government inquiries?
- What customer information does the merchant provide?
  - Customer locations?
  - Customer ages?
  - Customer genders?
  - Customer marital status?
  - Customer income?
  - Other demographical information about customers?
- What are the sizes of the merchant's business customers?
- Does the merchant identify notable customers?
- Does the merchant provide a blogging feature on its website?
  - How many links are provided within the blog?
  - How many blogging entries per time period?
- Does the merchant use an escrow service for payment/delivery?

What shipping relationships does the merchant offer (e.g., United Parcel Service, Federal Express) and does the merchant provide an URL to the shipper's website?

Does the merchant identify other related websites?

Does the merchant have a partner program for exchanging customer information with partners?

What online (e.g., Google, Yahoo) and offline (e.g., Yellow Pages, radio stations) advertising relationships does the merchant identify, what are they, and how long have the relationships existed?

How many d/b/a names does the merchant identify and what are they?

Does the merchant identify a Federal/State Taxpayer ID?

Does the merchant identify a Federal Employer Identification Number?

How does the merchant characterize the business activity to be provided by the merchant? Example: Business activities falling into the categories of sites excluded from Google Checkout may be a negative contribution to the merchant reliability score.

What other URLs does the merchant identify, how many, and what are their purposes, types, and wording?

Does the merchant provide a Dun & Bradstreet DUNS Number and/or an Experian Business Number?

Does the merchant identify registered trademarks or other intellectual property?

The scoring authority may also collect reliability information from third-parties ("third party provided information") to compute the merchant reliability metric. See the communications 314, for example, flowing from the third-party data source 316 through the communications network 308 to the scoring authority 302. It should be understood, however, that the communication of merchant-provided information may flow via alternative paths, such as alternative electronic communication channels, telephone, mail or courier for entry into the scoring authority 302.

For example, when signing up with a scoring service to obtain a merchant reliability metric and a merchant reliability metric badge, the merchant may be asked to provide authorization that allows the scoring authority 302 access to certain information collected and provided by third-parties, such as credit bureaus, criminal records databases, etc. In addition, the scoring authority 302 may also collect to reliability information from public record sources, such as certain government records, commercial databases, online information services, etc. As with merchant-provided information, a binary parameter value may be assigned to the presence of certain reliability characteristics or the lack thereof, based on the information obtained from third party sources. In some cases, the binary parameter value may indicate that the information pertaining to a specific reliability characteristic existed in the collected information. In other cases, the binary parameter value may indicate that the obtained information was independently verified from another source. In yet other cases, the binary parameter value may indicate that the obtained information meets certain requirements (e.g., the merchant has a credit score above a specified threshold). A variable parameter value may be assigned to the value of other third-party characteristics, such as a parameter value that represents a point within a value range or a certain level within a range of discrete levels.

Example reliability characteristics obtained from third-party provided information are listed below, although it should be understood that other characteristics may also contribute to the merchant reliability metric. Some of these characteristics may be parameterized as a binary parameter value (e.g., does the merchant have any bankruptcy filings or judgments against it or are the merchant's SEC filings up to date?) and others may be parameterized by a variable parameter value (e.g., how many employees do state tax records indicate the merchant currently employs or what is the merchant's debt to credit ratio?). Also, the third-party information may be compared against any corresponding merchant-provided or transactional information, such that a match provides a positive contribution to the merchant reliability metric and a mismatch provides a negative contribution to the merchant reliability metric. Various combinations of these characteristics and others are contemplated.

Credit Report Data

Does the merchant have a reported credit score and what is that score?

What is the merchant's payment history?
How many lines of credit?
How many late payments/defaults?
What are the temporal severities of the late payments?
What type of credit does the merchant have (e.g., school loans, mortgage debt, credit card debt)?
What amount of debt payment is currently past due?
What is the amount of debt payment currently past due as a percentage of available credit?
What are the number of charge-offs and the money volume of charge-offs?

Debt and credit information of the merchant
What is the total available credit of the merchant?
How recently have the lines of credit been established for the merchant?
What is the total amount of debt and available credit of the merchant and its owners and/or managers?
What is the debt to credit ratio of the merchant?
How much of the merchant's debt is installment debt and how much is revolving debt?
How long is the merchant's revolving debt carried?

What liens/judgments/garnishments against the merchant are included on the credit report?

What bankruptcy filings and/or judgments against the merchant are included in the credit report?

What repossessions, foreclosures and payments plans have been instituted against the merchant?

How many addresses for the merchant are found and for what period of time did the merchant reside at each address?

Are the social security numbers of owners and/or managers active and do they have any alerts reported?

How many employees does the merchant employ and how long have they been employed?

Public Record Data
Articles of organization (business formation documents)
How long have they existed in the jurisdiction's business database?
What type of business organization does the merchant possess?
Is the merchant in good standing with the jurisdiction's business database and for how long?
How many d/b/a names does the merchant identify and what are they?
Is the merchant a public company?
Are the merchant's SEC filings (e.g., 10-K, 10-Q) up to date?
Does the merchant owe back taxes?

Lawsuits
How many lawsuits have been filed against or by the merchant historically?
How many lawsuits have been filed against or by the merchant are currently pending?

What types of lawsuits have been filed against or by the merchant?

In which jurisdictions have the lawsuits been filed?

What types of action (e.g., class action, against multiple parties, or against single party; criminal or civil) have been filed against or by the merchant?

What are the locations of the proceedings (e.g., foreign or domestic)?

Regulatory actions

How many regulatory body orders or complaints been filed against the merchant?

How recently have the orders or complaints been filed against the merchant?

Which agencies filed the orders or complaints against the merchant? Domestic or foreign agencies?

What is the underlying basis for the filings (e.g., unfair and deceptive trade practices, fraud)?

How many announced investigations (e.g., via FTC Press Releases) against the merchant have been launch and by which agencies?

What is the underlying basis for the investigations (e.g., antitrust activity, illegal export)?

What is the location of the action or proceedings (e.g., foreign or domestic)?

How many Internet Crime Complaints (ICCs) exist in the FBI's Online Complain Database for the merchant?

Is the merchant or members of its board, its officers, or management on the Office of Foreign Assets Control (OFAC) Specially Designated Nationals (SPN) list?

Is the merchant headquartered, in contact with, or hosted by a barred country on the OFAC SDN list?

Uniform Domain-Name Dispute-Resolution Policy (UDRP) proceedings

How many UDRP proceedings have been filed against or by the merchant historically?

How many UDRP proceedings have been filed against or by the merchant are currently pending?

Judgments against merchant (regardless of whether regulatory or judicial)

What type of relief (monetary, injunctive, both)?

What was the magnitude of the judgment (e.g., dollar value, jail time)?

How many judgments against the merchant exist?

Internet Statistics

What is the merchant's online traffic volume (e.g., as determined by online activity monitoring service, such as Alexa.com, compete.com, and comscore.com)?

Payment Channels

Does the merchant's website support payment by payment processors, such as Google Checkout or Paypal, or credit cards, such as VISA or MasterCard?

Intellectual property and licensing

Has the merchant obtained any State or Federal intellectual property registration (e.g. trademark, copyright, patent)?

Has the merchant become a licensed or otherwise authorized dealer of a particular commercial product?

Whois information (an example domain data service)

Does the name, address, and other contact information of the domain owner from Whois.com match the merchant-provided information?

Is the Domain Name System (DNS)/Registrar foreign or domestic?

What is the physical location of the hosting provider?

What is the identity of the hosting provider?

Is the merchant's domain privately registered so that certain contact information for the domain is not publicly available? Note: Some types of private registration require provision of contact information for the merchant, whereas proxy registration provides the domain registrar's contact info, which can better protect unreliable merchants.

Does the information available in the domain registration obviously false? Note: Some information required of a merchant for registration may be incomplete or inconsistent (e.g., a 6 digit telephone number or an address in a city that does not exist in the indicated state).

Does the domain's information from Whois.com list administrative and technical contacts in the same locations as the registrant?

What type of entity are the administrative and technical contacts identified by Whois.com?

How long has the domain been held by the registrant?

What type of domain is the merchant's domain (e.g., cctld or gtld, .com vs. .net vs. .biz)?

Search engine information

In which type of industry does the merchant operate and is that industry search engine friendly (e.g., the cell phone industry may be more search engine friendly than the car parts industry)?

How many links are found on average or in total to the merchant's website?

Are the average and total link counts for the merchant's website increasing over time?

Of what quality are the entities linking to the merchant's website (e.g., links from more reliable companies may be considered more positive that links from less reliable companies)?

Does the merchant's website show up in "organic search results" (e.g., not sponsored links or ads)?

Black lists

Is the merchant and/or any of its IP addresses on any spam lists, Yahoo/Google/Other blacklists, or real-time blackhole lists?

Third-party seals

Does the merchant's website possess commercial seals, such as HackerSafe, BuySafe, Amazon/Ebay ratings, Bizrate)?

Has the merchant been reviewed in a review database and what are the numbers of positive and negative reviews?

How does the merchant's website compare against known safe websites in the same or similar industry?

SSL Certificates

How many SSL certificates are presented by the merchant's website and what types (e.g., domain validation (DV), operation/organizational validation (OV), and extended validation (EV))?

Does domain information provided in the SSI, certificate match other information collected by the scoring authority?

Does business license information provided in the SSL certificate match other information collected by the scoring authority?

Does the merchant's phone information provided in the SSL certificate match other information collected by the scoring authority?

Does legal existence and identity information provided in the SSL certificate match other information collected by the scoring authority?

Does the organization name provided in the SSI certificate match other information collected by the scoring authority?

Does the unique registration number assigned to the merchant by the jurisdiction of incorporation and specified in the SSL certificate match other information collected by the scoring authority?

Does the merchant's address provided in the SSL certificate match other information collected by the scoring authority?

Does the merchant's operational existence provided in the SSL certificate match other information collected by the scoring authority?

Does existence of a demand deposit account with a financial institution, as provided in the SSL certificate, match other information collected by the scoring authority?

Does the domain name provided in the SSL certificate match other information collected by the scoring authority?

Does the apparent authorization for requesting an EV SSL certificate match other information collected by the scoring authority?

How long has the merchant had the SSL certificate?

What entity is the Certificate Authority?

Was the SSI certificate issued by a direct issuer or by a reseller?

Does a guarantee by the SSI Certificate Authority exist?

What is the amount of the guarantee?

Where is the SSL certificate located on the merchant's website? Note: The higher the percentage of pages exhibiting the SSL certificate on the merchant's website, the more positive the impact on the merchant reliability metric.

Commercial databases

Business credit reports (e.g., D&B, Experian Business Report)

Associated with characteristics similar to consumer credit reports, described above.

Paypal/Google/Mastercard/VISA/American Express/Discover/etc.

What are the volumes of chargebacks and overall transactions through the merchant and is the percentage of chargebacks to overall transactions decreasing over time?

What is the volume of chargebacks through the merchant and is the volume of chargebacks decreasing over time?

What is the average size of purchases through the merchant and is that average size increasing over time?

What is the average quantity of items per purchase through the merchant and is that average quantity increasing over time?

What are the volumes of returns and overall transactions through the merchant and is the percentage of returns to overall transactions decreasing over time?

What is the volume of returns through the merchant and is the volume of returns decreasing over time?

What is the number of repeat customers and is the volume of repeat customers increasing over time?

What is the number of fraud claims against the merchant and is the volume of fraud claims decreasing over time?

Is the merchant listed on a black list?

What are the numbers of customer and vendor disputes that have occurred with a merchant and are these numbers decreasing over time?

What are the locations of the merchant's transactions (e.g., locations where the site is hosted)?

What are the locations of the merchant's end customers?

What level of detail did the merchant provide to the commercial database when the merchant signed up for the commercial database service?

How long has the merchant been a subscriber of the commercial database service?

How many and what kind of payment channels (e.g., Paypal/Google/Mastercard/VISA/American Express/Discover/etc.) does the merchant offer?

The scoring authority may also collect reliability information from customers of the merchant ("transactional information") to compute the merchant reliability metric. See the communications 314, for example, flowing from the transaction feedback source 320, such as individual customers, through the communications network 308 to the scoring authority 302. It should be understood, however, that the communication of merchant-provided information may flow via alternative paths, such as alternative electronic communication channels, telephone, mail or courier for entry into the scoring authority 302.

For example, the scoring authority 302 may provide an interface through which customers can submit feedback on their transactional experiences with the merchant. As with merchant-provided and third-party-provided information, a binary parameter value may be assigned to the presence of certain reliability characteristics or the lack thereof, based on the information obtained from the transaction feedback sources. In some cases, the binary parameter value may indicate that the information pertaining to a specific reliability characteristic existed in the collected information. In other cases, the binary parameter value may indicate that the obtained information was independently verified from another source. In yet other cases, the binary parameter value may indicate that the obtained information meets certain requirements (e.g., the merchant has a customer satisfaction level above a specified threshold). A variable parameter value may be assigned to the value of other transactional characteristics, such as a parameter value that represents a point within a value range or a certain level within a range of discrete levels.

Example reliability characteristics obtained from transactional information are listed below, although it should be understood that other characteristics may also contribute to the merchant reliability metric. Some of these characteristics may be parameterized as a binary parameter value (e.g., does the merchant contact information provided by the customer match the merchant contact information obtained from other sources or does the purchase involve a recurring charge to the customer?) and others may be parameterized by a variable parameter value (e.g., what was the dollar amount of the purchase or how many goods did the customer purchase?). Also, the transactional information may be compared against any corresponding merchant-provided or third-party information, such that a match provides a positive contribution to the merchant reliability metric and a mismatch provides a negative contribution to the merchant reliability metric. Various combinations of these characteristics and others are contemplated.

What is the merchant contact information provided by the customer and does it match the contact information provided by the merchant or third parties?

Did the customer purchase a good, a service, or both?
What was the dollar amount of the purchase?
Does the purchase involve a recurring charge to the customer?
Did the customer purchase multiple goods in the transaction?
How long is the term of the service purchased by the customer in the transaction?
What was the location of the customer when he or she made the purchase?
How would the customer rate his or her satisfaction with the good or service (e.g., on a scale of 1 to 30)?
How would the customer rate his or her satisfaction with the time it took to receive the good or service (e.g., on a scale of 1 to 30)?
How would the customer rate his or her satisfaction with the accuracy of the amount he or she was charged for the good or service (e.g., on a scale of 1 to 30)?
How would the customer rate his or her belief that the amount charged by the merchant was authorized (e.g., on a scale of 1 to 30)?
How would the customer rate his or her belief that the date the charge was listed on his or her statement was the correct transaction date (e.g., on a scale of 1 to 30)?
How would the customer rate his or her belief that her or she was properly charged for the goods or services received (e.g., on a scale of 1 to 30)?
Was the good or service sent to the customer's correct delivery address?
How would the customer rate his or her belief that the goods or services were in a condition that he or she found acceptable (as opposed to needing to be returned) (e.g., on a scale of 1 to 30)?
How would the customer rate his or her satisfaction with the merchant's return policy, whether the customer returned the goods or services received (e.g., on a scale of 1 to 30)?
What was the fee for a return of a purchased good or service to the merchant?
Was the return processed in a timely manner?
Did the customer experience any unexpected or undisclosed charges?
How many options did the customer have for contacting customer service?
How would the customer rate his or her satisfaction with the quality of the merchant's customer service (e.g., on a scale of 1 to 30)?
How would the customer rate his or her satisfaction with the availability of the merchant's customer service, such as hours of service, etc. (e.g., on a scale of 1 to 30)?
How would the customer rate his or her satisfaction with the helpfulness of the merchant's customer service (e.g., on a scale of 1 to 30)?
How would the customer rate his or her satisfaction with the availability of live, real-time customer service (e.g., on a scale of 1 to 30)?

The data collected according to the inspection template for each merchant is mapped to a point value and stored in the merchant reliability datastore 304 for application in the scoring model 306, where the point values are aggregated into sub-scores that are combined (and possibly weighted) to yield the merchant reliability metric. Each data items in the scoring model may be weighted and may provide a positive, neutral, or negative contribution to the merchant reliability metric of a particular merchant.

A variety of scoring models may be implemented to provide a merchant reliability metric. An example scoring model is described below, with assorted variations provided throughout the description. In one implementation, the characteristic factors and weightings are defined to reward (with a higher metric) merchants that provide accurate information, have strong financial and security infrastructures, and can demonstrate a history of reliable behavior, and they are defined to penalize (with a lower metric) merchants that cannot meet these qualifications or do not meet them as well as others merchants. Naturally, most merchants will exhibit some positive characteristics and some negative characteristics, so that the resulting merchant reliability metrics tend to lie within the extremes of the reliability range.

The resulting merchant reliability metrics may also be computed within a predefined reliability range, such that the metric for one merchant is defined relative to that of all other scored merchants. In this scenario, the point values assigned to certain reliability characteristics are based on how well a reliability characteristic of the merchant compares to the same (or a related) reliability characteristic of another merchant. For example, the merchant may indicate that it believes it should be compared to www.bestbuy.com. However, in many or all characteristics, the merchant scores much lower than Best Buy. Accordingly, the resulting merchant reliability metric, sub-scores points, or weightings may be scaled down to indicate that, as compared to the merchants to which the merchant believes it is of equivalent reliability, the merchant's reliability characteristics do not demonstrate this. Therefore, the merchant's reliability score is reduced to indicate the risk.

The example scoring model employs a variety of reliability characteristics, as listed below, although other reliability characteristics may be defined in an inspection template for other implementations. Example weights for individual scoring items are provided as well, as a percentage contribution to the overall Merchant Reliability Metric (MRM).

| Key Scoring Elements | Characteristic Category | Weight (W) | Sub-Score Points (P) |
|---|---|---|---|
| Customer Feedback Data (CFD) | Transactional | 15 | 7 |
| Payment Dispute History (PDH) | Third-party | 15 | 0 |
| Shopping Cart Security (SCS) | Third-party | 15 | 13 |
| Internet Statistics (IS) | Third-party | 15 | 15 |
| Merchant Information (MI) | Merchant | 10 | 4 |
| Public Records (PR) | Third-party | 10 | 9.5 |
| Merchant Credit File (MCF) | Third-party | 10 | −10 |
| Transactional Data (TD) | Transactional | 10 | 3 |
| Merchant Reliability Metric (MRM) | | 100% | weighted sum = 41.5 |

The example merchant reliability metric is computed according to the following algorithm, although other algorithms are contemplated:

$$MRM = W_{CFD}*P_{CFD} + W_{PDH}*P_{PDH} W_{SCS}*P_{SCS} + W_{IS}*P_{IS} + W_{MI}*P_{MI} + W_{PR}*P_{PR} + W_{MCF}*P_{MCF} + W_{TD}*P_{TD}$$

The example merchant reliability metric is based on a scale of 0-100+, wherein the metric is categorized as follows:

| Metric Value | "Grade" | Description |
| --- | --- | --- |
| 90-100+ | A | Very high likelihood of a reliable merchant |
| 80-89 | B | High likelihood of a reliable merchant |
| 70-79 | C | Likelihood of a reliable merchant |
| 60-69 | D | High likelihood of an unreliable merchant |
| 0-59 | F | Very high likelihood of an unreliable merchant |

Each sub-score of the scoring model is derived from available information, as defined in the inspection template. The inspection template defines the characteristics collected and the points allocated to a certain characteristic result. For example, if the merchant states that it adheres to a written privacy policy, its privacy policy characteristic sub-score within Merchant Information may be assigned 7 points. On the other hand, if the merchant does not provide a URL to a privacy policy that can be reviewed by users, 3 points may be deducted from that sub-score for a total of 4 sub-score points. Other methods of determining a total number of sub-score points for individual characteristics are described below.

In one implementation, with respect to the Merchant Credit File (MCF) sub-score, the scoring model assigns a numerical value (e.g., positive, negative, neutral) for certain information contained in a merchant's credit file, including the consumer credit score. When applied to a company, business credit reports the to tax ID numbers (e.g., Dunn & Bradstreet numbers, etc., which are example business credit reporting organizations) may be used. Optionally, the consumer credit reports for owners and/or managers may be used. For example, if a merchant has a low credit score, the scoring model may assign a low or negative value to the merchant's MCF sub-score to indicate a heightened level of risk as it relates to merchant reliability, including characteristics such as merchant trust, information security, information use, and/or information privacy when purchasing goods and/or service from the merchant. In one example, the MCF sub-score may be selected from the following table:

| Credit Score | MCF Sub-score Points |
| --- | --- |
| 800-850 | 15 |
| 750-799 | 12.5 |
| 700-749 | 10 |
| 650-699 | 5 |
| 600-649 | 0 |
| 550-599 | −5 |
| 500-549 | −10 |
| 450-499 | −15 |
| 400-449 | −18 |
| 350-399 | −19 |
| 300-349 | −20 |

An MCF sub-score illustrated above is an example of a variable parameter value, in that the point value assigned varies within a range with the value of the credit score. The MCF sub-score could also be augmented with a binary parameter value by adding a point value if the credit file indicate no current delinquent accounts.

An MCF sub-score may also be an average of points for multiple credit scores. For example, if the merchant has three owners, their individual credit scores may be averaged together to represent the credit score in the leftmost column above, so that the resulting point value reflects the contribution of credit scores from each owner. Alternatively, the point values associated with each owner's credit score may be averaged together to obtained the aggregated sub-score result.

In one implementation, with respect to a Shopping Cart Security (SCS) sub-score, the scoring model assigns a numerical value (e.g., positive, negative, neutral) to the presence or absence of certain third-party trust seals that may appear on the merchant's website. Each seal indicates and/or certifies that a merchant has undergone some level of review/screening in order to be authorized to display the seal. If the merchant does not have a minimum level of third-party trust seals, the scoring model may assign a low or negative value to the merchant's SCS sub-score to indicate a heightened level of risk as it relates to merchant reliability, including characteristics such as merchant trust, information security, information use, and/or information privacy when purchasing goods and/or service from the merchant. In one example, the SCS sub-score may be computed from the following table, which sums point values for those third-party trust seals that are present on the merchant's website:

| Seal | Individual Point Value | Present? | Sub-Score Point Contribution |
| --- | --- | --- | --- |
| EV SSL CERT | 8 | Yes | 8 |
| OV SSL CERT | 5 | NO | |
| DV SSL CERT | 2 | NO | |
| HackerSafe Seal | 3 | YES | 3 |
| BuySafe Seal | 2 | NO | |
| TRUSTeSeal | 2 | YES | 2 |
| | | Total | 13 |

In one implementation, with respect to an Internet Statistics (IS) sub-score, the scoring model assigns a numerical value (e.g., positive, negative, neutral) to the traffic volume experienced by the merchant's website, the site ranking attained by the merchant's website, and the number of search engine links associated with the merchant's website. Each component may be weighted differently than another within the IS sub-score. These characteristics all represent a certain level of popularity of a website. The more popular a merchant's website is, the less likely the merchant's site will prove unreliable to a customer. If the merchant does not have a minimum level of internet traffic, site rankings, and/or search engine links, the scoring model may assign a low or negative value to the merchant's IS sub-score to indicate a heightened level of risk as it relates to merchant reliability, including characteristics such as merchant trust, information security, information use, and/or information privacy when purchasing goods and/or service from the merchant. In one example, the IS sub-score may be computed from the following table, which sums point values for the components that pertain to the merchant's website:

| Internet Statistic | Point Value | Present? | Sub-Score Point Contribution |
| --- | --- | --- | --- |
| Google Links | | | |
| 10,000 or greater | 10 | NO | |
| 9000-9999 | 9 | NO | |
| 8000-8999 | 8 | NO | |
| 7000-7999 | 7 | NO | |
| 6000-6999 | 6 | NO | |
| 5000-5999 | 5 | NO | |

-continued

| Internet Statistic | Point Value | Present? | Sub-Score Point Contribution |
|---|---|---|---|
| 4000-4999 | 4 | NO | |
| 3000-3999 | 3 | YES | 3 |
| 2000-2999 | 2 | NO | |
| 1000-1999 | 1 | NO | |
| 0-999 | 0 | NO | |
| Yahoo! Links | | | |
| 10,000 or greater | 10 | NO | |
| 9000-9999 | 9 | NO | |
| 8000-8999 | 8 | NO | |
| 7000-7999 | 7 | NO | |
| 6000-6999 | 6 | NO | |
| 5000-5999 | 5 | NO | |
| 4000-4999 | 4 | NO | |
| 3000-3999 | 3 | NO | |
| 2000-2999 | 2 | NO | |
| 1000-1999 | 1 | YES | 1 |
| 0-999 | 0 | NO | |
| MSN Links | | | |
| 10,000 or greater | 10 | NO | |
| 9000-9999 | 9 | NO | |
| 8000-8999 | 8 | NO | |
| 7000-7999 | 7 | NO | |
| 6000-6999 | 6 | NO | |
| 5000-5999 | 5 | NO | |
| 4000-4999 | 4 | NO | |
| 3000-3999 | 3 | NO | |
| 2000-2999 | 2 | NO | |
| 1000-1999 | 1 | NO | |
| 0-999 | 0 | YES | 0 |
| Google Top X | | | |
| Top 10 | 10 | NO | |
| Top 50 | 9 | NO | |
| Top 100 | 8 | NO | |
| Yahoo Top X | | | |
| Top 10 | 10 | NO | |
| Top 50 | 9 | NO | |
| Top 100 | 8 | NO | |
| MSN Top X | | | |
| Top 10 | 10 | NO | |
| Top 50 | 9 | NO | |
| Top 100 | 8 | NO | |
| Alexa Traffic Data Site Rankings | | | |
| Top 100 | 10 | NO | |
| Top 500 | 9 | NO | |
| Top 1000 | 8 | NO | |
| Top 5000 | 7 | NO | |
| Top 10,000 | 6 | NO | |
| Top 50,000 | 5 | YES | 5 |
| Top 100,000 | 4 | NO | |
| Alexa Links | | | |
| 10,000 or greater | 10 | NO | |
| 9000-9999 | 9 | NO | |
| 8000-8999 | 8 | NO | |
| 7000-7999 | 7 | NO | |
| 6000-6999 | 6 | NO | |
| 5000-5999 | 5 | NO | |
| 4000-4999 | 4 | NO | |
| 3000-3999 | 3 | NO | |
| 2000-2999 | 2 | NO | |
| 1000-1999 | 1 | YES | 1 |
| 0-999 | 0 | NO | |
| Compete Traffic Data Site Rankings | | | |
| Top 100 | 10 | NO | |
| Top 500 | 9 | NO | |
| Top 1000 | 8 | YES | 8 |
| Top 5000 | 7 | NO | |
| Top 10,000 | 6 | NO | |
| Top 50,000 | 5 | NO | |
| Top 100,000 | 4 | NO | |
| Monthly Visits to Site | | | |
| 10,000 or greater | 10 | NO | |
| 9000-9999 | 9 | NO | |
| 8000-8999 | 8 | NO | |
| 7000-7999 | 7 | YES | 7 |
| 6000-6999 | 6 | NO | |
| 5000-5999 | 5 | NO | |
| 4000-4999 | 4 | NO | |
| 3000-3999 | 3 | NO | |
| 2000-2999 | 2 | NO | |
| 1000-1999 | 1 | NO | |
| 0-999 | 0 | NO | |
| Total | | | 25 |

In one implementation, with respect to an Merchant Information (MI) sub-score, the scoring model assigns a numerical value (e.g., positive, negative, neutral) presence of certain merchant-provided information as it relates to privacy policies, return policies, site terms and conditions, length of time in business, etc. If the merchant does not provide or demonstrate the existence of a minimum level of information, the scoring model may assign a low or negative value to the merchant's MI sub-score to indicate a heightened level of risk as it relates to merchant reliability, including characteristics such as merchant trust, information security, information use, and/or information privacy when purchasing goods and/or service from the merchant. In one example, the MI sub-score may be computed from the following table, which sums point values for the components that pertain to the merchant's website:

| Merchant Information | Individual Point Value | Sub-Score Point Contribution |
|---|---|---|
| Written Privacy Policy | | |
| Verified as present | 3 | |
| Indicated as present | 3 | |
| Indicated as absent | −3 | −3 |
| Verified as absent | −3 | |
| Written Terms and Conditions | | |
| Verified as present | 6 | |
| Indicated as present | 3 | 3 |
| Indicated as absent | −3 | |
| Verified as absent | −6 | |
| Return Policy | | |
| 10 day return policy | 1 | |
| 30 day return policy | 2 | |
| 60 day return policy | 3 | |
| No return policy | −3 | −3 |
| Physical Location | | |
| Presence of a physical location | 3 | |
| Lack of a physical location | 0 | 0 |
| Merchant Online Location | | |
| US | 3 | 3 |
| State: | | |
| VA | 2 | 2 |
| CA | −1 | |

-continued

| Merchant Information | Individual Point Value | Sub-Score Point Contribution |
|---|---|---|
| NY | 1 | |
| Canada | 2 | |
| OFAC Country | −7 | |
| Time in Business | | |
| 0-2 years | 2 | |
| 3-5 years | 5 | 5 |
| 6-10 years | 10 | |
| 11 or more years | 20 | |
| Total | | 7 |

A company running a scoring authority may employ independent or internal investigators to review affidavits, URLs, web pages, public records, etc. to confirm the merchant-provided information. The Written Privacy Policy and Written Terms and Conditions characteristics above are examples of characteristics for which verification enhances the positive or negative effect on the merchant's reliability score. For example, if the merchant indicates that it has a written privacy policy, three points are added to the Merchant Information sub-score. Further, if the presence of a written privacy policy is verified, then three more points are added to the Merchant Information sub-score.

In one implementation, with respect to a Public Records (PR) sub-score, the scoring model assigns a numerical value (e.g., positive, negative, neutral) to the presence of certain information obtained from public records as it relates to individual or company bankruptcies, litigation, liens, judgments, state licenses, etc. Various items of information can contribute positively or negatively to the PR sub-score and therefore the merchant reliability metric. If the merchant has public record filings against them, such as tax liens or a bankruptcy, the scoring model may assign a low or negative value to the merchant's PR sub-score to indicate a heightened level of risk as it relates to merchant reliability, including characteristics such as merchant trust, information security, information use, and/or information privacy when purchasing goods and/or service from the merchant. If the merchant has state licensing filings, for example, the scoring model may assign a high or positive value to the merchant's PR sub-score to indicate a diminished level of risk as it relates to merchant reliability, including characteristics such as merchant trust, information security, information use, and/or information privacy when purchasing goods and/or service from the merchant. In one example, the PR sub-score may be computed from the following table, which sums point values for the components that pertain to the merchant's website:

| Public Record | Individual Point Value | Sub-Score Point Contribution |
|---|---|---|
| Bankruptcy | | |
| Yes | −2.5 | |
| No | 2.5 | 2.5 |
| Litigation | | |
| As plaintiff | −2.5 | |
| As defendant | −1.5 | −1.5 |
| No litigation | 2.5 | |
| Liens | | |
| Tax liens | −2.5 | |
| UCC liens | −2.5 | |
| No liens | 2.5 | 2.5 |
| Judgments | | |
| Judgments | −2.5 | |
| No Judgments | 2.5 | 2.5 |
| OFAC (Office of Foreign Assets Control) | | |
| On OFAC list | −7 | |
| Not on OFAC list | 7 | 7 |
| Professional License | | |
| Attorney | 3 | |
| CPA | 3 | |
| Doctor | 3 | |
| Nurse | 3 | |
| Social Worker | 3 | |
| Criminal Records | | |
| Fraud | −10 | |
| Theft | −6 | |
| Felony | −8 | |
| Misdemeanor | −4 | |
| No criminal record | 5 | 5 |
| Total | | 18 |

In one implementation, with respect to a Transactional Data (TD) sub-score, the scoring model assigns a numerical value (e.g., positive, negative, neutral) to the ratings provided by customers about their shopping experience with the merchant and its website. Positive customer ratings predict a higher level of merchant reliability, including customer satisfaction with the transaction and its results (e.g., delivery of the product and/or service). Various items of information can contribute positively or negatively to the TD sub-score and therefore the merchant reliability metric. If the merchant has accumulated a certain degree of negative customer feedback, the scoring model may assign a low or negative value to the merchant's TD sub-score to indicate a heightened level of risk as it relates to merchant reliability, including characteristics such as merchant trust, information security, information use, and/or information privacy when purchasing goods and/or service from the merchant. In contrast, if the merchant has accumulated a certain degree of positive customer feedback, for example, the scoring model may assign a high or positive value to the merchant's TD sub-score to indicate a diminished level of risk as it relates to merchant reliability, including characteristics such as merchant trust, information security, information use, and/or information privacy when purchasing goods and/or service from the merchant. In one example, the TD sub-score may be computed from the following table, which sums point values for the components that pertain to the merchant's website:

| Customer Feedback | Individual Point Value | Sub-Score Point Contribution |
|---|---|---|
| Delivery of Goods/Services | | |
| Proper receipt | 2 | 2 |
| Timely receipt | 3 | 3 |

-continued

| Customer Feedback | Individual Point Value | Sub-Score Point Contribution |
|---|---|---|
| Condition of Goods/Service | | |
| Good | 3 | |
| Average | 1 | 1 |
| Poor | −2 | |
| Spam | | |
| Customer was spammed as a result of the transaction | −2 | |
| No spam | 2 | 2 |
| Use of Personally Identifiable Information (PII) | | |
| Merchant misused PII | −3 | |
| Merchant did not misuse PII | 1 | 1 |
| Payment | | |
| Merchant incorrectly charged customer's credit card | −3 | |
| Merchant correctly charged customer's credit card | 1 | 1 |
| Customer Service | | |
| Service representatives were: | | |
| Friendly | 1 | 1 |
| Unfriendly | −1 | |
| Responsive | 1 | 1 |
| Non-responsive | −1 | |
| Overall Customer Experience | | |
| Excellent | 6 | |
| Good | 4 | |
| Average | 2 | 2 |
| Poor | −1 | |
| Horrible | −6 | |
| Total | | 14 |

Figure 4:
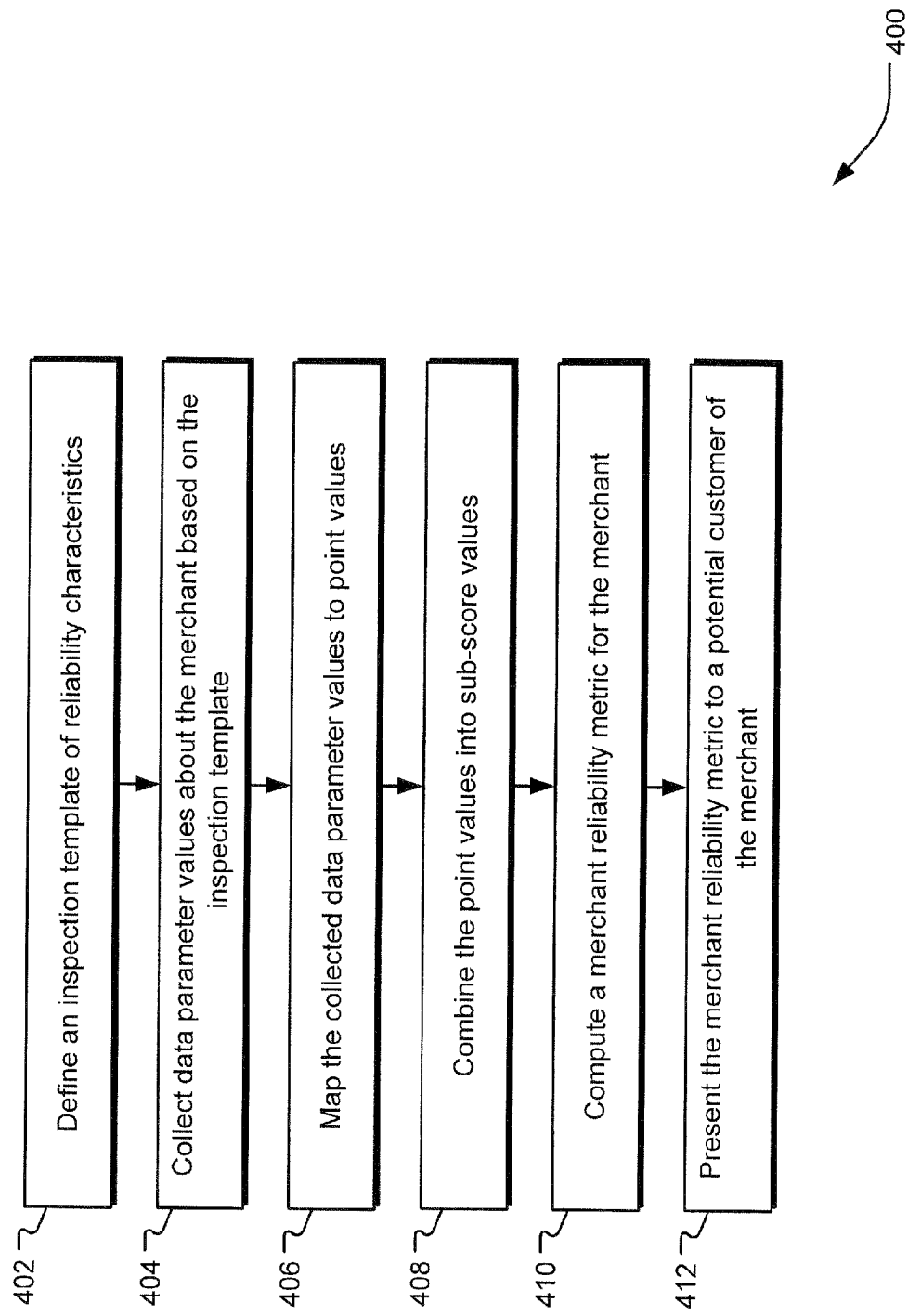
FIG. 4 illustrates example operations for collecting source data upon which a merchant reliability metric may be based.

FIG. 4 illustrates example operations 400 for collecting source data upon which a web score may be based. A defining operation 402 defines an inspection template of reliability characteristics. Examples of the characteristics that may be listed in an inspection template are described in the description of FIG. 3, although other types of characteristics may be identified in the inspection template as well. The inspection template may also define where to obtain the data pertaining to each characteristic. For example, the inspection template may identify where in a sign up form a scoring authority may extract parameter data values pertaining to a merchant's address.

A collection operation 404 collects data parameter values about the merchant based on the inspection template. In one example, the scoring authority reads the inspection template to identify a location and/or a procedure for obtaining the data parameter value for each characteristic listed in the inspection template. The scoring authority then finds the location and/or executes the procedure to extract the data from the data repository or from other sources (e.g., a public records database, an online activity monitoring service, etc.).

A mapping operation 406 maps the collected data parameter values to point values and a combining operation 408 combines the point values into sub-score values, as described in the description of the example scoring model. Based on the sub-score values, a computation operation 410 computes a merchant reliability metric for the merchant. In some cases, each sub-score value may be weighted based on information defined a scoring model. A presentation operation 412 presents the merchant reliability metric to a potential customer of the merchant, such as by displaying a summary page or a detailed web page providing access to the metric and potentially the supporting data parameter values.

Figure 5:
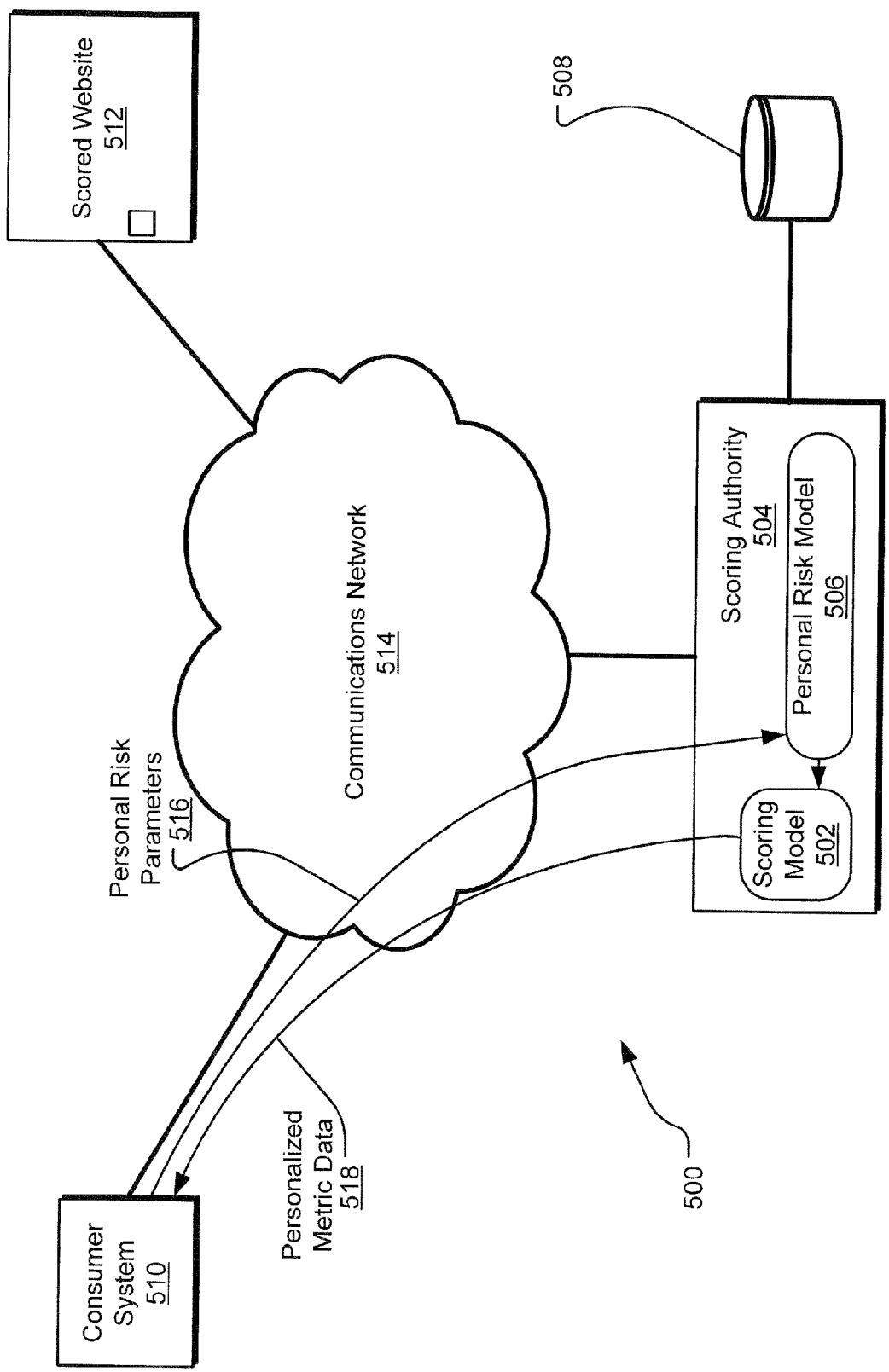
FIG. 5 illustrates an example system providing a merchant reliability metric personalized based on consumer input.

FIG. 5 illustrates an example system 500 providing a web score personalized based on consumer input. By annotating a scoring model 502 in a scoring authority 504 with a personal risk model 506, a consumer (who represents a potential customer of the merchant) can adjust weightings, point values, and/or the scale/range based on the consumer's personal preferences.

In one implementation, the scoring authority 504 has collected data parameter values for a plurality of merchant reliability characteristics and stored the data parameter values in a data repository 508 in association with a merchant identifier and/or an identifier of a scored website 512. In addition, the consumer system 510 has delivered (e.g., via a communication network 514) personal risk parameters 516 for the personal risk model 506, associated with a consumer identifier (e.g., username, etc.). When the consumer requests a merchant reliability metric for a specified merchant, the scoring authority 504 extracts the data parameter values associated with the merchant reliability characteristics for the merchant, adjust the weighting or values for certain merchant reliability characteristics according to the personal risk model 506, and computes a personalized merchant reliability metric, which is presented to the consumer in personalized metric data 518. In summary, the personal risk model 506 causes the merchant reliability score computed by the scoring authority 504 to be adjusted according the personal risk parameters 516 provided by the consumer.

In one example, the consumer is prompted to answer a series of questions regarding their risk tolerance with merchants (e.g., how risk averse are you, what level of confidence do you want with online transactions) and what types of information he or she views as more important to others in predicting the reliability of merchants (e.g., do you believe credit data should be weighted more than feedback of other customers of the merchant?). The former series of questions may adjust the scale or "grade" attributed to a merchant reliability metric, for example. Likewise, the latter series of questions may adjust the weighting attributed to individual merchant reliability characteristics or data sources of such characteristics (e.g., the merchant, third-parties, customers).

In another implementation, the consumer may be prompted to identify other websites he or she believes are safe. The resulting merchant reliability metrics may then be adjusted according to the differences between sub-score contributions of individual characteristics of the merchant of interest and the identified "safe" merchant. For example, the consumer may indicate that he or she believes that www.bestbuy.com is a safe site. If the merchant of interest scores well in many characteristics relative to those of Best Buy, then the merchant of interest's reliability score may be enhanced to be more comparable to that of Best Buy. Accordingly, the resulting merchant reliability metric, sub-scores points, or weightings may be scaled up to indicate that, as compared to Best Buy, the merchant of interest demonstrates reliability similar to that of Best Buy and so the consumer may choose to attribute a similar level of "safety" to the merchant.

Figure 6:
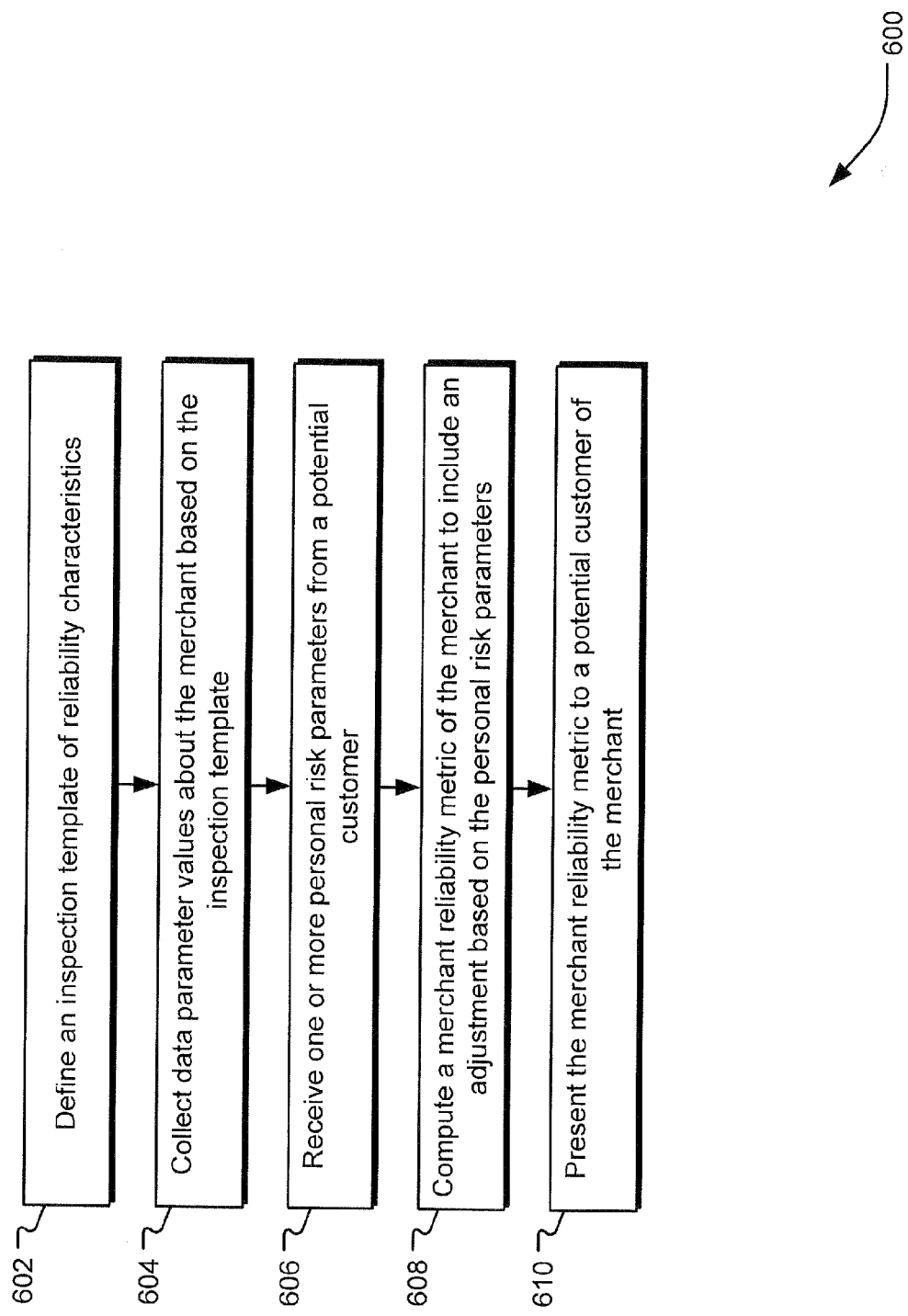
FIG. 6 illustrates example operations for providing a merchant reliability metric.

FIG. 6 illustrates example operations 600 for providing a web score. A defining operation 602 defines an inspection template of reliability characteristics. Examples of the characteristics that may be listed in an inspection template are described in the description of FIG. 3, although other types of characteristics may be identified in the inspection template as well. The inspection template may also define where to obtain the data pertaining to each characteristic. For example, the inspection template may identify where in a sign up form a scoring authority may extract parameter data values pertaining to a merchant's address.

A collection operation 604 collects data parameter values about the merchant based on the inspection template. A receiving operation 606 receives one or more personal risk parameters from a potential customer. A computation operation 608 computes a merchant reliability metric for the merchant based on the personal risk parameters. In some cases, the personal risk parameters adjust weighting on data parameter values or sub-score values. In other cases, the personal risk parameter biases the computed merchant reliability metric according to the potential customer's risk parameters (e.g., multiplies the computed merchant reliability metric by 1.1 if the merchant's data parameter values are compatible the risk parameters). A presentation operation 610 presents the merchant reliability metric to a potential customer of the merchant, such as by displaying a summary page or a detailed web page providing access to the metric and potentially the supporting data parameter values.

Figure 7:
FIG. 7 illustrates an example merchant reliability metric report.

FIG. 7 illustrates an example web score report 700.

Figure 8:
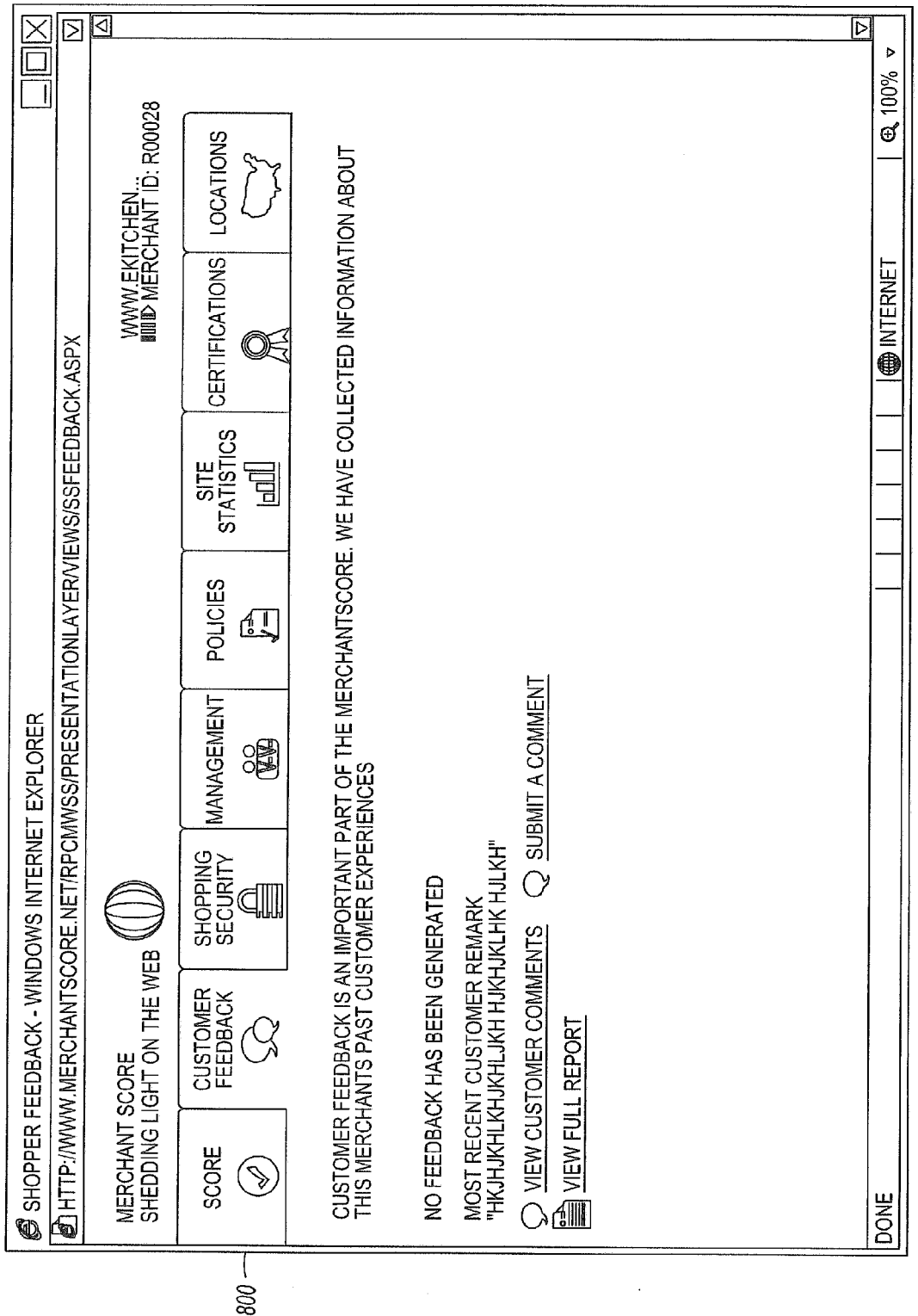
FIG. 8 illustrates an example web page for submission and reporting of a customer's transaction feedback.

FIG. 8 illustrates an example web page 800 for submission and reporting of a customer's transaction feedback.

Figure 9:
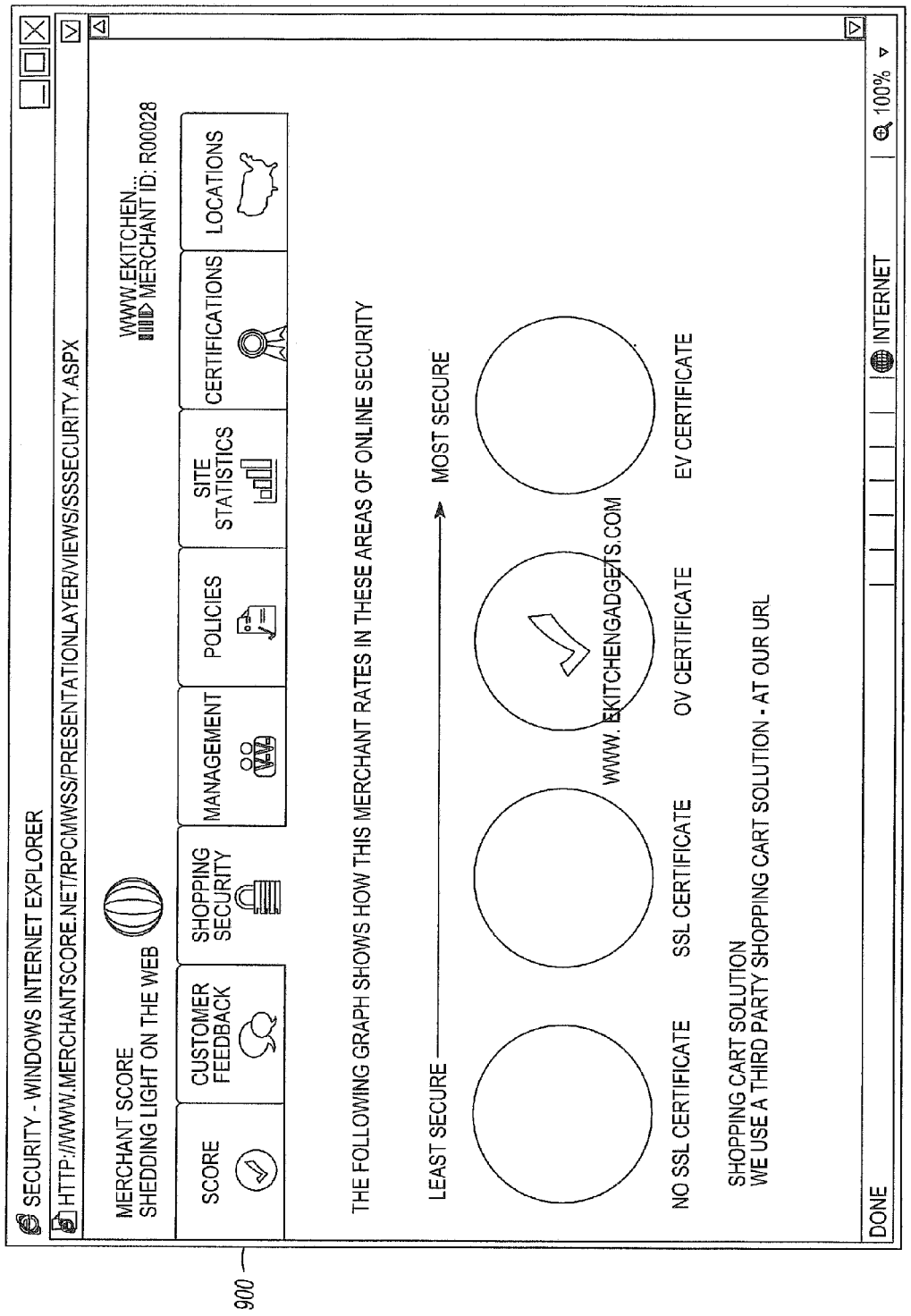
FIG. 9 illustrates an example web page reporting a merchant's security information.

FIG. 9 illustrates an example web page 900 reporting a merchant's security information.

Figure 10:
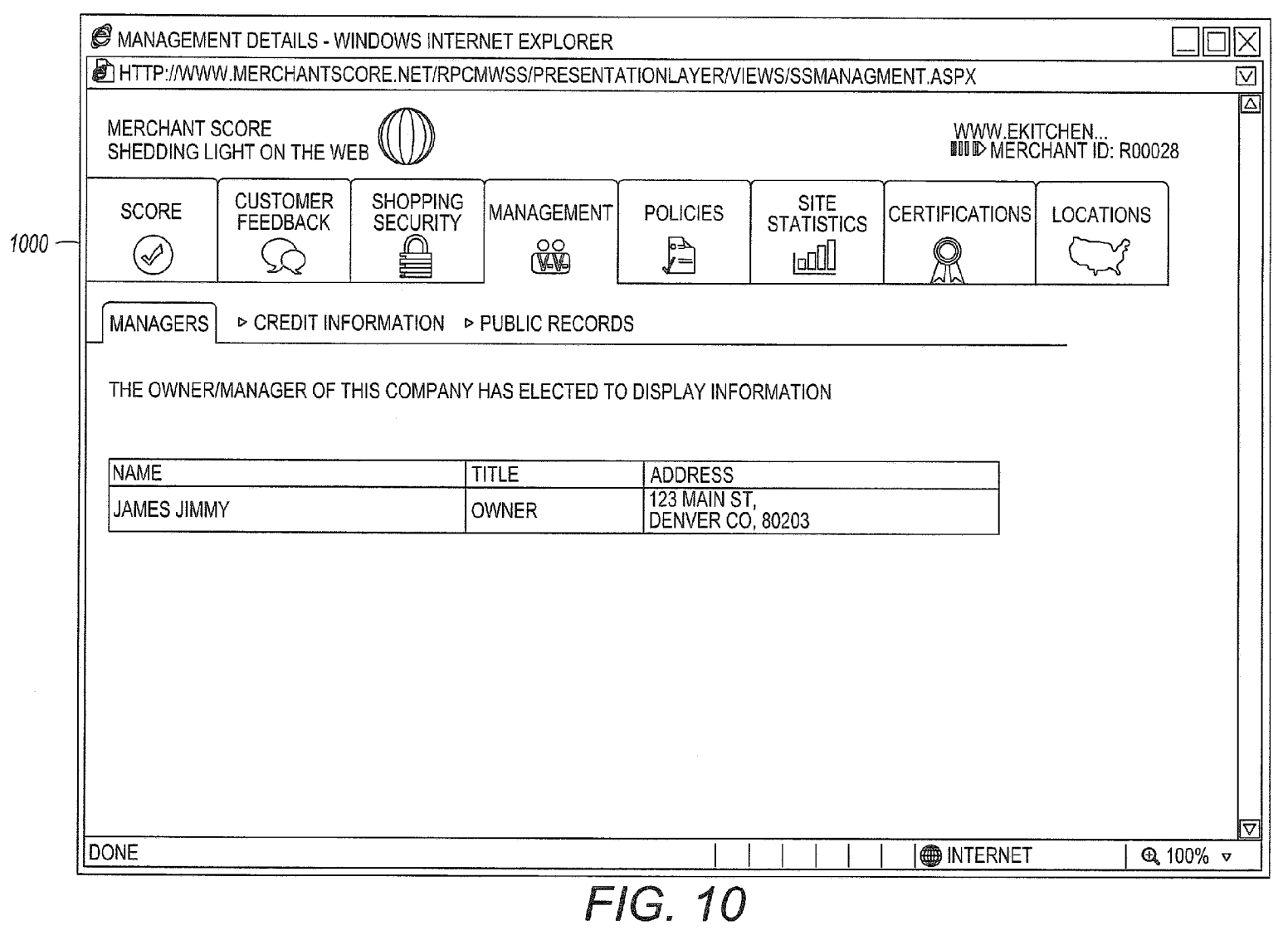

FIG. 10 illustrates an example web page 1000 reporting a merchant's management information.

Figure 11:
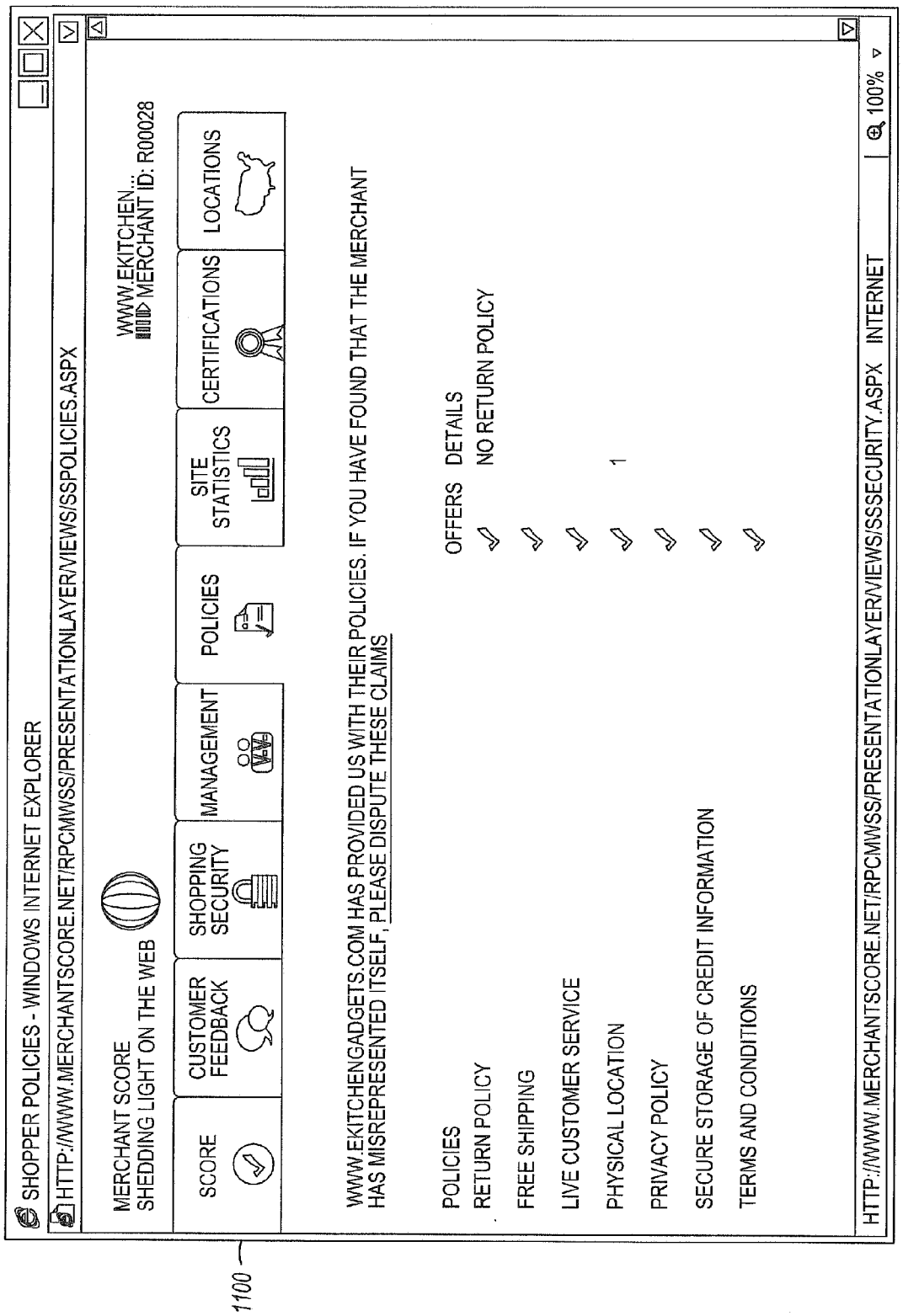
FIG. 11 illustrates an example web page reporting a merchant's shopper policies.

FIG. 11 illustrates an example web page 1100 reporting a merchant's shopper policies.

Figure 12:
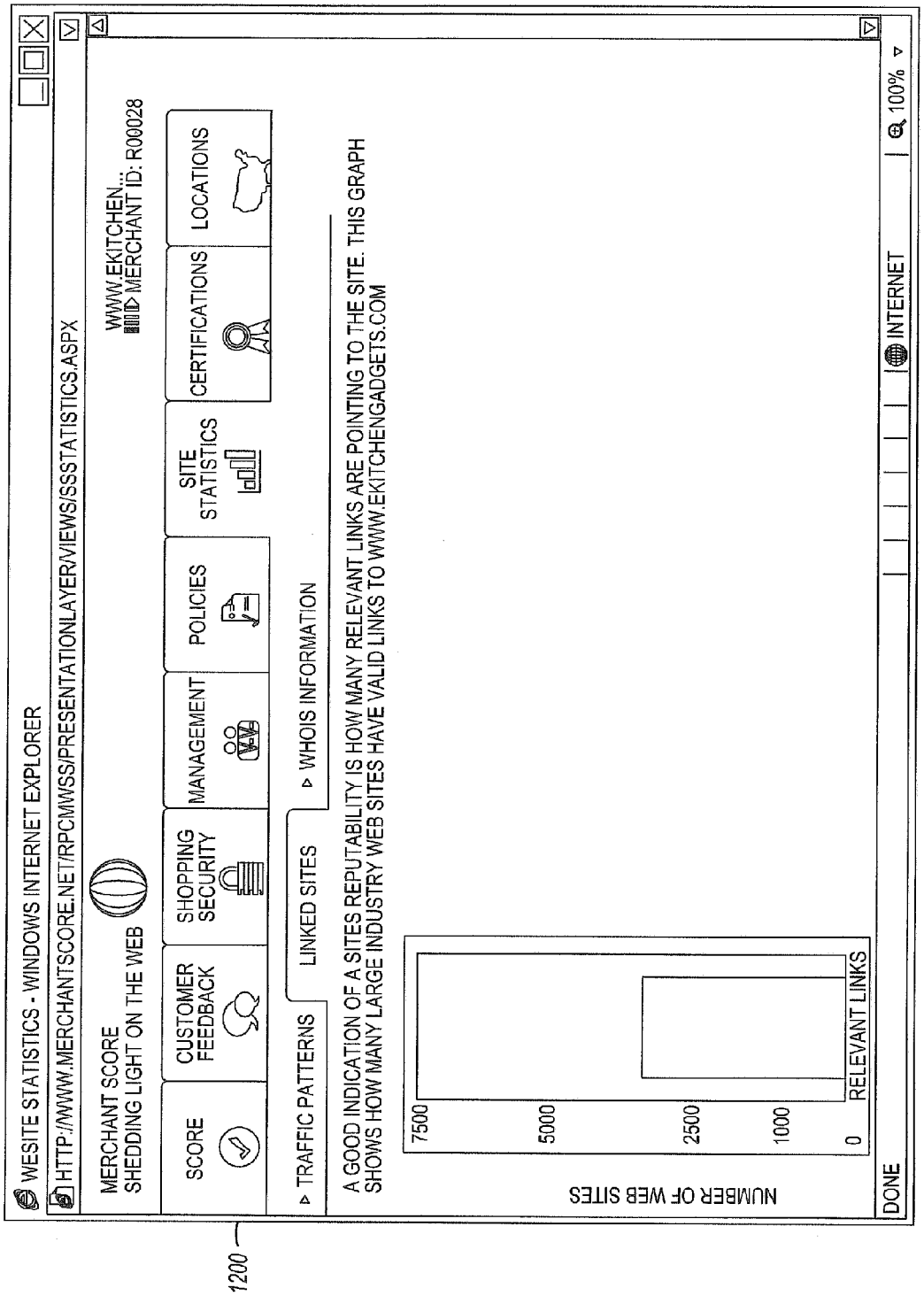
FIG. 12 illustrates an example web page reporting a merchant's website statistics.

FIG. 12 illustrates an example web page 1200 reporting a merchant's website statistics.

Figure 13:
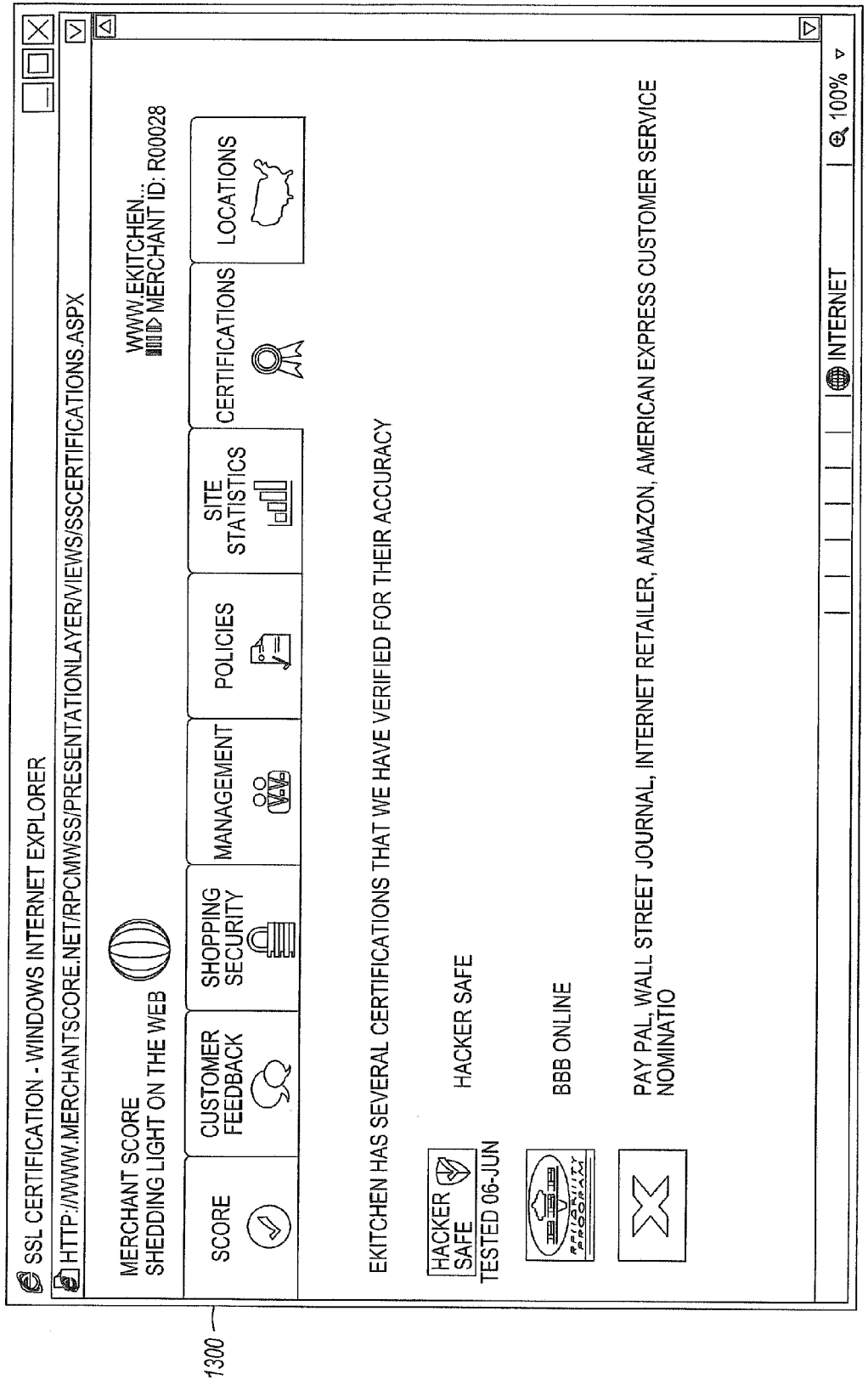
FIG. 13 illustrates an example web page reporting a merchant's certification information.

FIG. 13 illustrates an example web page 1300 reporting a merchant's certification information.

Figure 14:
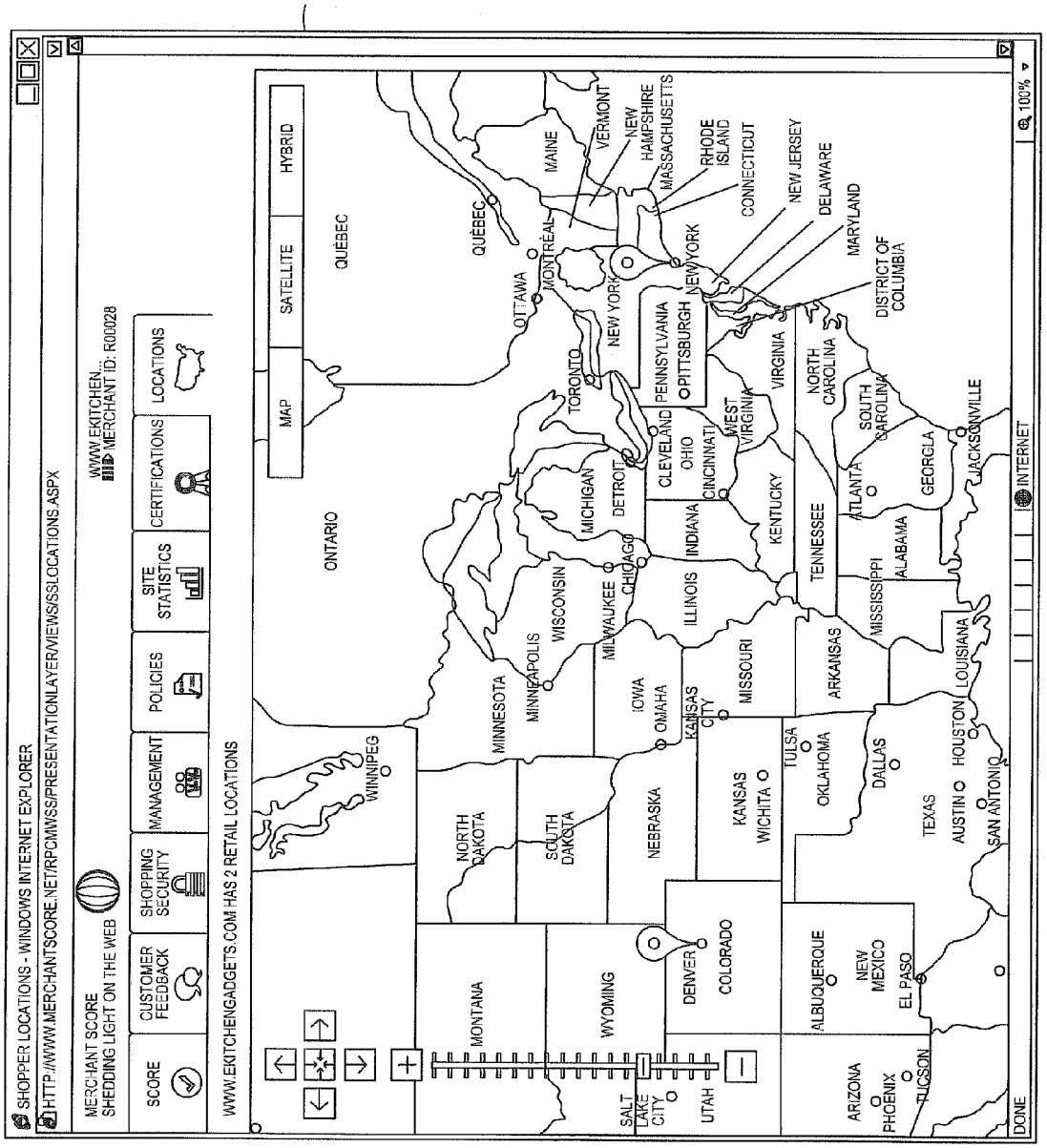
FIG. 14 illustrates an example web page reporting a merchant's retail locations.

FIG. 14 illustrates an example web page 1400 reporting a merchant's retail locations.

Figure 15:
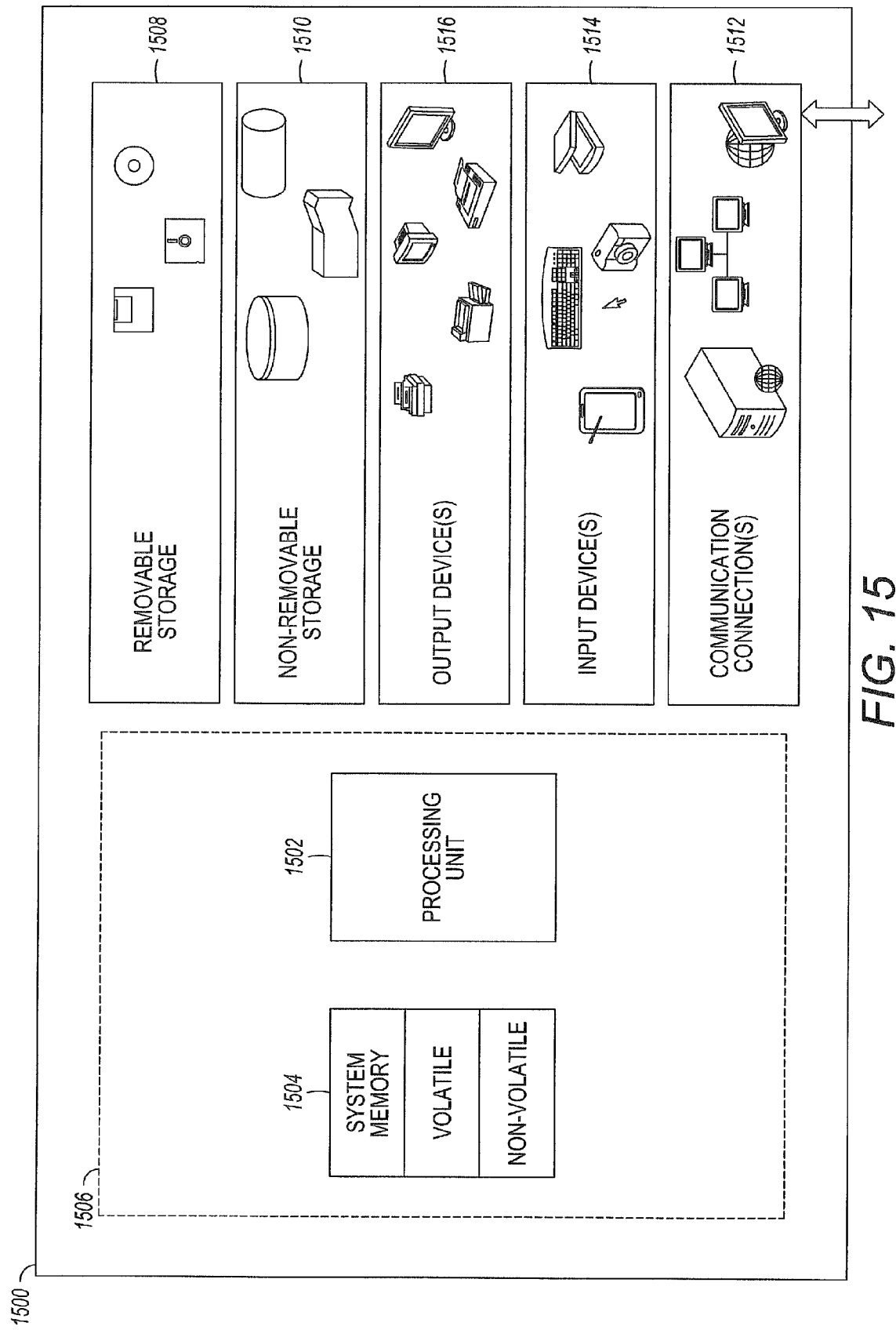
FIG. 15 illustrates an example system on which the described technology may be implemented.

FIG. 15 illustrates an exemplary computer system 1500 for calculating the Web Score and implementing the transactional database as described herein. In one implementation, the computer system 1500 may be embodied by a desktop computer, laptop computer, or application server computer, although other implementations, for example, video game consoles, set top boxes, portable gaming systems, personal digital assistants, and mobile phones may incorporate the described technology. The computer system 1500 typically includes at least one processing unit 1502 and memory 1504. Depending upon the exact configuration and type of the computer system 1500, the memory 1504 may be volatile (e.g., RAM), non-volatile (e.g., ROM and flash memory), or some combination of both. The most basic configuration of the computer system 1500 need include only the processing unit 1502 and the memory 1504 as indicated by the dashed line 1506.

The computer system 1500 may further include additional devices for memory storage or retrieval. These devices may be removable storage devices 1508 or non-removable storage devices 1510, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 1502. Information, for example, relating to merchants, scoring elements, and transactions may be stored on the storage media using any method or technology for storage of data, for example, computer readable instructions, data structures, and program modules.

The computer system 1500 may also have one or more communication interfaces 1512 that allow the system 1500 to communicate with other devices. The communication interface 1512 may be connected with a network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interface 1512 over the network via a modulated data signal, e.g., a carrier wave or other transport medium. A modulated data signal is an electromagnetic signal with characteristics that can be set or changed in such a manner as to encode data within the signal.

In some implementations, articles of manufacture, for example, a web score generating tool, are provided as computer program products. One implementation of a computer program product provides a computer program storage medium readable by the computer system 1500 and encoding a computer program. Another implementation of a computer program product may be provided in a computer data signal embodied in a carrier wave by the computer system 1500 and encoding the computer program.

The computer system 1500 may further have a variety of input devices 1514 and output devices 1516. Exemplary input devices 1514 may include a keyboard, a mouse, a tablet, a touch screen device, a scanner, a visual input device, and a microphone or other sound input device. Exemplary output devices 1516 may include a display monitor, a printer, and speakers. Such input devices 1514 and output devices 1516 may be integrated with the computer system 1500 or they may be connected to the computer system 1500 via wires or wirelessly, e.g., via a Bluetooth protocol. These integrated or peripheral input and output devices are generally well known and are not further discussed herein.

In an example implementation, a scoring model module, a security authority module and other modules may be embodied by instructions stored in memory 1504 and/or storage devices 1508 or 1510 and processed by the processing unit 1502. Merchant-provided information, third-party-provided information, transactional information, merchant reliability metrics, and other data may be stored in memory 1504 and/or storage devices 1508 or 1510 as persistent datastores.

The implementations described herein can be implemented as logical steps in one or more computer systems. The logical operations of the present invention can be implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Although various implementations have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying exhibits shall be interpreted as illustrative only of particular implementations and not limiting. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A computer program product, comprising:
a non-transitory computer-readable medium having computer-readable program instructions embodied thereon that when executed by a computer cause the computer to predict reliability of merchants, the computer-readable program instructions comprising:
computer-readable program instructions to define an inspection template listing a first merchant reliability characteristic and a second merchant reliability characteristic;
computer-readable program instructions to collect data parameter values about the merchant based on the characteristics listed in the inspection template, the data parameter values comprising a binary parameter value representing the first merchant reliability characteristic and a variable parameter value representing the second merchant reliability characteristic;
computer-readable program instructions to map each of the determined parameter values to a corresponding a point value;
computer-readable program instructions to combine the point values into at a first sub-score value pertaining to a merchant-provided reliability characteristic and a second sub-score value pertaining to a non-merchant-provided reliability characteristic;
computer-readable program instructions to compute a merchant reliability metric, the merchant reliability metric predicting reliability of the merchant by applying each of the sub-score values as a contribution to the merchant reliability metric; and
computer-readable program instructions to present the merchant reliability metric to the potential customer of the merchant.

2. The computer program product of claim 1, wherein the computing the merchant reliability metric comprises computer-readable program instructions to apply each of the sub-score values as a weighted contribution to the merchant reliability metric.

3. The computer program product of claim 1, further comprising:
computer-readable program instructions to apply a weighting to a collected data parameter value based on a level of importance placed on a merchant reliability characteristic identified by the potential customer, the collected parameter value corresponding to the merchant reliability characteristic identified by the potential customer; and
computer-readable program instructions to adjust the merchant reliability metric according to the applied weighting, prior to presenting the merchant reliability metric to the potential customer.

4. The computer program product of claim 1, wherein a data parameter value mapped to the second sub-score for the non-merchant-provided reliability characteristic is provided by a prior customer of the merchant about a prior transaction with the merchant.

5. The computer program product of claim 1, wherein a data parameter value mapped to the second sub-score for the non-merchant-provided characteristic is provided by a verification inspector that verifies a data parameter value of at least one merchant-provided characteristic using a data parameter value of at least one non-merchant-provided characteristic.

6. The computer program product of claim 1, wherein a data parameter value mapped to the second sub-score for the non-merchant-provided characteristic is provided by a third party that is not party to a transaction with the merchant.

7. A method of predicting reliability of a merchant, the method comprising:
defining, by one or more computing devices, an inspection template listing a first merchant reliability characteristic and a second merchant reliability characteristic;
collecting, by the one or more computing devices, data parameter values about the merchant based on the characteristics listed in the inspection template, including a binary parameter value representing the first merchant reliability characteristic of the merchant and a variable parameter value representing the second merchant reliability characteristic of the merchant;
mapping, by the one or more computing devices, each of the determined parameter values to a corresponding a point value;
combining, by the one or more computing devices, the point values into at a first sub-score value pertaining to a merchant-provided reliability characteristic and a second sub-score value pertaining to a non-merchant-provided reliability characteristic;
computing, by the one or more computing devices, a merchant reliability metric predicting reliability of the merchant by applying each of the sub-score values as a contribution to the merchant reliability metric; and
presenting by the one or more computing devices, the merchant reliability metric to a potential customer of the merchant.

8. The method of claim 7, wherein the computing the merchant reliability metric comprises applying each of the sub-score values as a weighted contribution to the merchant reliability metric.

9. The method of claim 7, further comprising:
applying a weighting to a collected data parameter value based on a level of importance placed on a merchant reliability characteristic identified by the potential customer, the collected parameter value corresponding to the merchant reliability characteristic identified by the potential customer; and
adjusting the merchant reliability metric according to the applied weighting, prior to presenting the merchant reliability metric to the potential customer.

10. The method of claim 7, wherein a data parameter value mapped to the second sub-score for the non-merchant-provided reliability characteristic is provided by a prior customer of the merchant about a prior transaction with the merchant.

11. The method of claim 7, wherein a data parameter value mapped to the second sub-score for the non-merchant-provided characteristic is provided by a verification inspector that verifies a data parameter value of at least one merchant-provided characteristic using a data parameter value of at least one non-merchant-provided characteristic.

12. The method of claim 7, wherein a data parameter value mapped to the second sub-score for the non-merchant-provided characteristic is provided by a third party that is not party to a transaction with the merchant.

13. A system for predicting reliability of merchants, comprising:
a storage medium; and
a processor configured to execute computer-executable instructions stored in the storage medium to cause the system to:
define an inspection template listing a first merchant reliability characteristic and a second merchant reliability characteristic;
collect data parameter values about the merchant based on the characteristics listed in the inspection template, the data parameter values comprising a binary parameter value representing the first merchant reliability characteristic and a variable parameter value representing the second merchant reliability characteristic;
map each of the determined parameter values to a corresponding a point value;
combine the point values into at a first sub-score value pertaining to a merchant-provided reliability characteristic and a second sub-score value pertaining to a non-merchant-provided reliability characteristic;
compute a merchant reliability metric, the merchant reliability metric predicting reliability of the merchant by applying each of the sub-score values as a contribution to the merchant reliability metric; and
present the merchant reliability metric to the potential customer of the merchant.

14. The system of claim 13, wherein the computing the merchant reliability metric comprises applying each of the sub-score values as a weighted contribution to the merchant reliability metric.

15. The system of claim 13, wherein the processor is further configured to execute computer-executable instructions stored in the storage medium to cause the system to:
to apply a weighting to a collected data parameter value based on a level of importance placed on a merchant reliability characteristic identified by the potential customer, the collected parameter value corresponding to the merchant reliability characteristic identified by the potential customer; and
adjust the merchant reliability metric according to the applied weighting, prior to presenting the merchant reliability metric to the potential customer.

16. The system of claim 13, wherein a data parameter value mapped to the second sub-score for the non-merchant-provided reliability characteristic is provided by a prior customer of the merchant about a prior transaction with the merchant.

17. The system of claim 13, wherein a data parameter value mapped to the second sub-score for the non-merchant-provided characteristic is provided by a verification inspector that verifies a data parameter value of at least one merchant-provided characteristic using a data parameter value of at least one non-merchant-provided characteristic.

18. The system of claim 13, wherein a data parameter value mapped to the second sub-score for the non-merchant-provided characteristic is provided by a third party that is not party to a transaction with the merchant.

* * * * *